United States Patent
Hsu et al.

(10) Patent No.: US 11,187,843 B2
(45) Date of Patent: Nov. 30, 2021

(54) ELECTRONIC DEVICE HAVING BACKLIGHT MODULE

(71) Applicant: InnoLux Corporation, Miao-Li County (TW)

(72) Inventors: Wei-Tsung Hsu, Miao-Li County (TW); Hui-Wen Su, Miao-Li County (TW); Chun-Fang Chen, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 16/916,862

(22) Filed: Jun. 30, 2020

(65) Prior Publication Data
US 2021/0011212 A1 Jan. 14, 2021

(30) Foreign Application Priority Data

Jul. 10, 2019 (CN) .......................... 201910620233.4
Feb. 5, 2020 (CN) .......................... 202010080360.2

(51) Int. Cl.
*F21V 8/00* (2006.01)

(52) U.S. Cl.
CPC ......... *G02B 6/0053* (2013.01); *G02B 6/0031* (2013.01); *G02B 6/0056* (2013.01); *G02B 6/0088* (2013.01)

(58) Field of Classification Search
CPC .. G02B 6/0053; G02B 6/0088; G02B 6/0031; G02B 6/0056; G02B 6/0036; G02B 6/005; G02F 1/133615
See application file for complete search history.

(56) References Cited

U.S. PATENT DOCUMENTS

| | | | |
|---|---|---|---|
| 8,159,632 B2 | 4/2012 | Kinoshita | |
| 2006/0133113 A1* | 6/2006 | Koike | G02B 6/0053 362/626 |
| 2009/0180053 A1* | 7/2009 | Song | G02F 1/133606 349/62 |
| 2011/0234580 A1* | 9/2011 | Wang | G02B 3/0068 345/418 |
| 2012/0195063 A1* | 8/2012 | Kim | G02B 6/0068 362/602 |
| 2017/0269283 A1* | 9/2017 | Wang | G02B 6/0016 |
| 2018/0081190 A1* | 3/2018 | Lee | G02B 6/005 |
| 2018/0128959 A1* | 5/2018 | Kashiwagi | G02F 1/133524 |

FOREIGN PATENT DOCUMENTS

TW 200949380 A 12/2009
WO WO-2009099547 A2 * 8/2009 ............... F21K 9/61

* cited by examiner

*Primary Examiner* — Donald L Raleigh
(74) *Attorney, Agent, or Firm* — McClure, Qualey & Rodack, LLP

(57) ABSTRACT

An electronic device is provided. The electronic device includes a backlight module. The backlight module includes a light-guiding plate and a light-guiding element, and the light-guiding element is disposed under the light-guiding plate. In addition, the light-guiding element has a protruding structure, and the protruding structure faces the light-guiding plate.

15 Claims, 14 Drawing Sheets

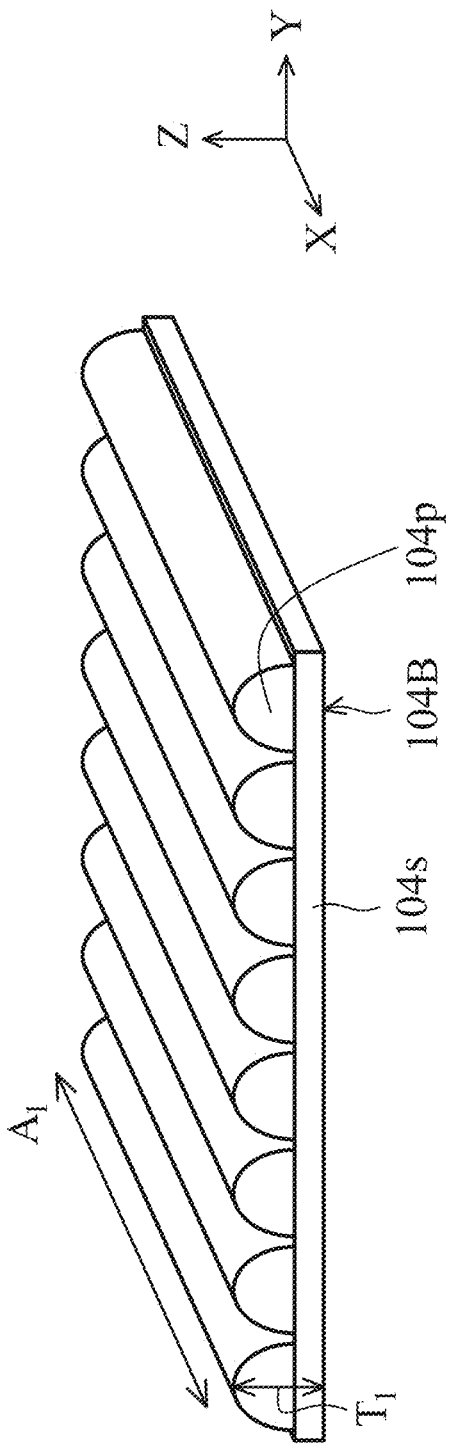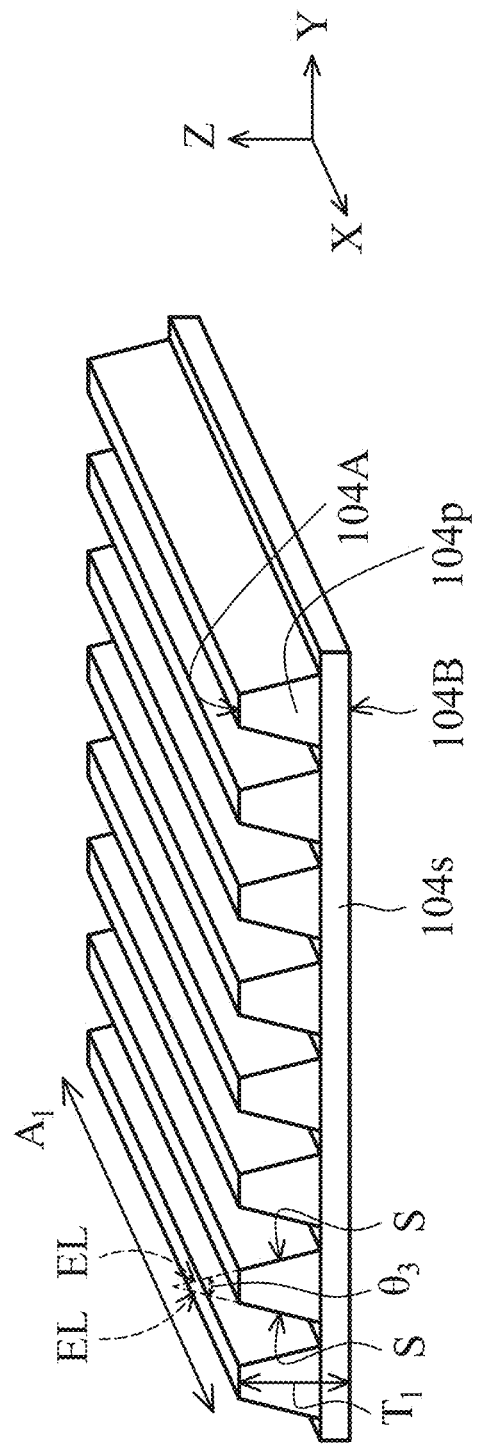
FIG. 2B
FIG. 2C

ELECTRONIC DEVICE HAVING BACKLIGHT MODULE

CROSS REFERENCE TO RELATED APPLICATIONS

This application claims priority of China Patent Application No. 201910620233.4, filed on Jul. 10, 2019 and China Patent Application No. 202010080360.2, filed on Feb. 5, 2020 the entirety of which are incorporated by reference herein.

BACKGROUND

Technical Field

The present disclosure relates to an electronic device, and in particular it relates to an electronic device having a light-guiding element.

Description of the Related Art

Existing electronic devices have a light leakage problem while in a dark state, and this can affect the display quality. In addition, the requirements for contrast and brightness of electronic devices are gradually increasing. Therefore, how to reduce light leakage in a dark state and improve contrast and/or brightness is one of the goals that the industry is currently aiming at.

SUMMARY

In accordance with some embodiments of the present disclosure, an electronic device is provided. The electronic device includes a backlight module. The backlight module includes a light-guiding plate and a light-guiding element, and the light-guiding element is disposed under the light-guiding plate. The light-guiding element has a protruding structure, and the protruding structure faces the light-guiding plate.

In accordance with some embodiments of the present disclosure, an electronic device is provided. The electronic device includes a backlight module. The backlight module includes a light-guiding plate and a light-guiding element. The light-guiding element is disposed under the light-guiding plate, and the light-guiding element has polarization characteristics.

A detailed description is given in the following embodiments with reference to the accompanying drawings.

BRIEF DESCRIPTION OF THE DRAWINGS

The disclosure may be more fully understood by reading the subsequent detailed description and examples with references made to the accompanying drawings, wherein:

FIG. 2B and FIG. 2C are structural schematic diagrams of a light-guiding element in accordance with some embodiments of the present disclosure;

DETAILED DESCRIPTION

Figure 1A:
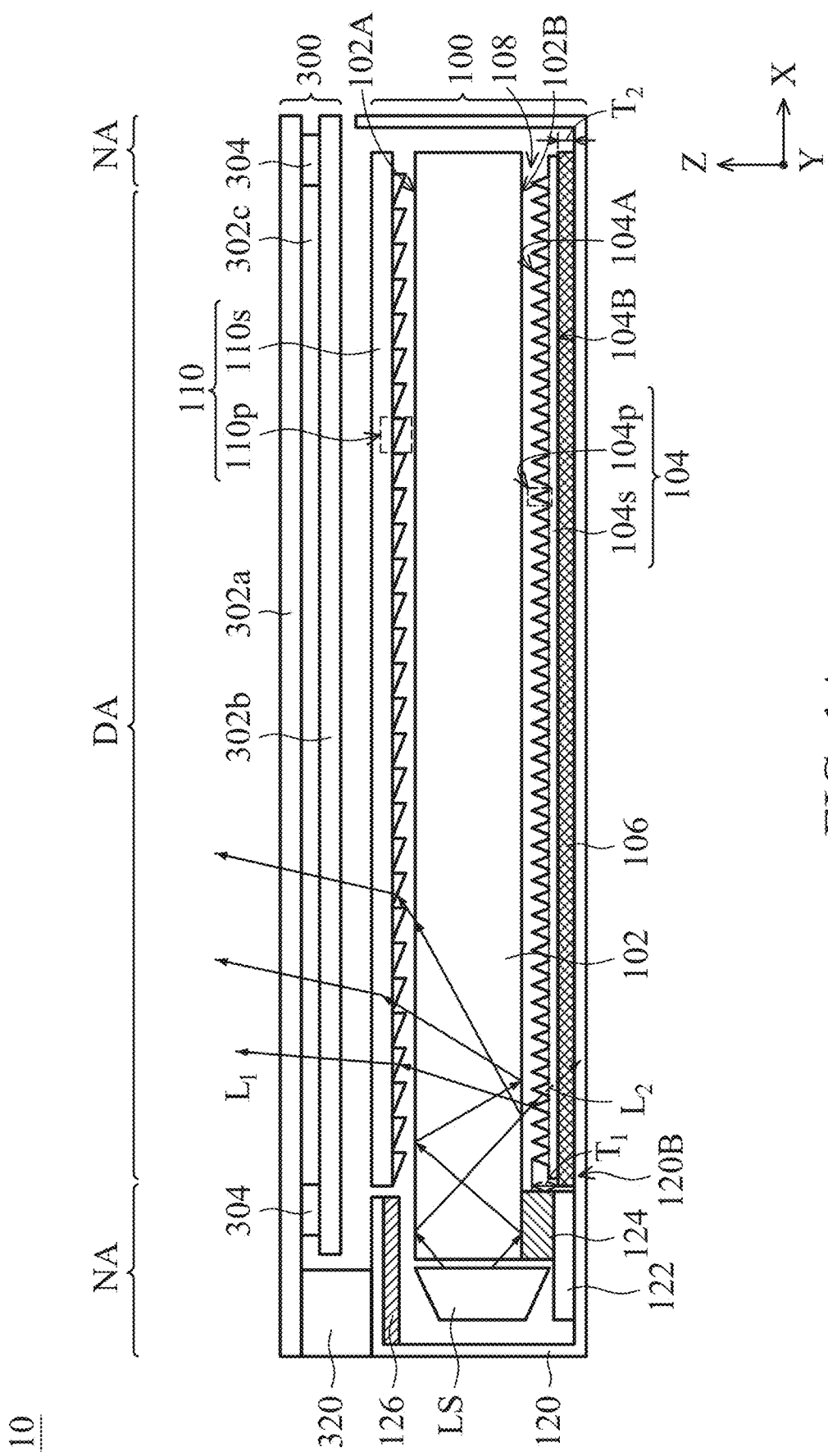
FIG. 1A is a cross-sectional schematic diagram of an electronic device in accordance with some embodiments of the present disclosure.

The structure of the electronic device of the present disclosure and the manufacturing method thereof are described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent that the exemplary embodiments set forth herein are used merely for the purpose of illustration. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments.

It should be understood that the elements or devices in the drawings of the present disclosure may be present in any form or configuration known to those with ordinary skill in the art. In addition, in the embodiments, relative expressions are used. For example, "lower", "bottom", "higher" or "top" are used to describe the position of one element relative to another. It should be appreciated that if a device is flipped upside down, an element that is "lower" will become an element that is "higher". The descriptions of the exemplary embodiments are intended to be read in connection with the accompanying drawings, which are to be considered part of the entire written description. It should be understood that the drawings are not drawn to scale. In addition, structures and devices are shown schematically in order to simplify the drawing.

In addition, it should be understood that, although the terms "first", "second", "third" etc. may be used herein to describe various elements, components, or portions, these elements, components, or portions should not be limited by these terms. These terms are only used to distinguish one element, component, or portion from another element, component, or portion. Thus, a first element, component, or portion discussed below could be termed a second element, component, or portion without departing from the teachings of the present disclosure.

The terms "about", "approximately", "substantially" and "roughly" typically mean +/−10% of the stated value, or +/−5% of the stated value, or +/−3% of the stated value, or +/−2% of the stated value, or +/−1% of the stated value or +/−0.5% of the stated value. The stated value of the present disclosure is an approximate value. When there is no specific description, the stated value includes the meaning of "about", "approximately", "substantially" or "roughly". Furthermore, the phrase "in a range from a first value to a second value" or "in a range between a first value and a second value" indicates the range includes the first value, the second value, and other values between them.

Certain terms are used in the specification and appended claims of the present application to refer to specific elements. Those skilled in the art should understand that electronic device manufacturers may refer to the same element by using different names. The present disclosure does not intend to distinguish between components that have the same function but different names. In the following description and claims, the terms "include" and "comprise" are open-ended words, and thus they should be interpreted as meaning "include but is not limited to . . . ".

In some embodiments of the present disclosure, terms concerning attachments, coupling and the like, such as "connected" and "interconnected", unless otherwise specifically defined, may refer to two structures being in direct contact, or may refer to two structures not being in direct contact and there are other structures between these two structures.

In addition, the following expression "the first element is disposed on the second element" includes the conditions where the first element and the second element are in direct contact, or another element is disposed between the first element and the second element so that they are not in direct contact. The following expression "the second element is disposed between the first element and the third element" includes the conditions that the second elements is in direct contact with the first element and/or the third element, or another element is disposed between the second element and the first element and/or the third element, and the first element and the second element are not in direct contact, or the second element and the third element are not in direct contact.

Unless defined otherwise, all technical and scientific terms used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined.

In some embodiments, the provided electronic device includes a light-guiding element, which can guide the light to a positive viewing angle, increase the contrast and/or brightness of the displayed image, or even can increase the effect of high dynamic range imaging (HDR). In some embodiments, the electronic device includes an absorption layer disposed corresponding to a display area. The absorption layer can absorb at least part of the interference light, which can reduce the influence of the interference light on the displayed image and increase the contrast and/or brightness of the displayed image. The content relating to interference light will be described in detail later.

Refer to FIG. 1A, which is a cross-sectional schematic diagram of an electronic device 10 in accordance with some embodiments of the present disclosure. It should be understood that in some embodiments, additional features may be added to the electronic device 10 described below. In some other embodiments, some features of the electronic device 10 described below may be replaced or omitted. The electronic device 10 may include, but is not limited to, a TV, a computer, a tablet computer, a smart phone, a car panel, a tiled display, other various electronic devices or a combination thereof.

In some embodiments, the electronic device 10 may comprise a panel 300 and a backlight module 100. The panel 300 is disposed on the backlight module 100. The panel 300 may have a display area DA and a non-display area NA. The non-display area NA is adjacent to or surrounds the display area DA. In some embodiments (as shown in FIG. 1A), the display area DA and the non-display area NA may be defined by a sealing member 304 (such as a sealant), but it is not limited thereto. In some embodiments, the panel 300 includes a first substrate 302*a*, a second substrate 302*b* and a display layer 302*c*. For example, the sealing member 304 is disposed between the first substrate 302*a* and the second substrate 302*b*, and the sealing member 304 defines an area for the panel 300, and the area may be defined as the display area DA, and the area outside the display area DA (including the area overlapping the sealing member 304) may be defined as the non-display area NA, but it is not limited thereto.

It should be understood that although only the first substrate 302*a*, the second substrate 302*b*, and the sealing member 304 of the panel 300 are illustrated in the drawings, the panel 300 may further include an alignment film, a polarizing plate, a light-shielding layer, a color filter and/or a driving element, but the present disclosure is not limited thereto. In some embodiments, the display layer 302*c* may include, but is not limited to, twisted nematic (TN) type liquid-crystal, super twisted nematic (STN) type liquid-crystal, vertical alignment (VA) type liquid-crystal, in-plane switching (IP S) type liquid-crystal, cholesteric type liquid-crystal, fringe field switching (FFS) type liquid-crystal, other suitable liquid-crystal materials or other suitable materials.

As shown in FIG. 1A, the backlight module 100 may comprise a light-guiding plate 102 and a light-guiding element 104. The light-guiding element 104 may be disposed under the light-guiding plate 102. In detail, the light-guiding element 104 may be adjacent to a bottom surface 102B of the light-guiding plate 102, and the light-guiding element 104 may or may not be in contact with the bottom surface 102B of the light-guiding plate 102. In some embodiments, an air 108 exists between the light-guiding element 104 and the light-guiding plate 102. In some embodiments, the light-guiding plate 102 is disposed between the light-guiding element 104 and the panel 300.

Refer to FIG. 1A, in some embodiments, the light-guiding element 104 is disposed corresponding to the display area DA, that is, the light-guiding element 104 at least partially overlap with the display area DA in a normal direction Z of the panel 300. In some embodiments, the light-guiding element 104 may be disposed corresponding to the non-display area NA, that is, the light-guiding element 104 may at least partially overlap with the non-display area NA in the normal direction Z of the panel 300. In some embodiments, the backlight module 100 may include a light source LS disposed adjacent to the light-guiding plate 102. For example, the light source LS may be disposed adjacent to at least one side of the light-guiding plate 102, and the light source LS may extend along the direction Y. In some embodiments (not illustrated), the backlight module 100 may include a plurality of light sources LS, and different light sources LS are disposed adjacent to different sides of the light-guiding plate 102.

As shown in FIG. 1A, in some embodiments, the light-guiding element 104 may comprise a base 104s and a protruding structure 104p. The protruding structure 104p may be disposed on the base 104s, and the protruding structure 104p may face the light-guiding plate 102. In some embodiments, the light-guiding element 104 may be an integrally formed element including the base 104s and the protruding structures 104p. In some embodiments, the material of the substrate 104 and the material of the protruding structure 104p may be the same or different. In some embodiments, the light-guiding element 104 includes a prism structure.

In some embodiments, the protruding structures 104p may have different widths in a cross-sectional direction. In some embodiments, in the cross-sectional direction, the width of the protruding structure 104 adjacent to the base 104s may be greater than the width of the protruding structure 104 adjacent to the top 104A, but it is not limited thereto. In some embodiments, the protruding structure 104p may comprise a tapered structure. In some embodiments, for example, the width of the protruding structure 104 gradually decreases from the position close to the base 104s to the top 104A in the cross-sectional direction. It should be understood that the aforementioned term "gradually decreased" is not limited to a proportional decrease. In some embodiments, the top 104A may be the top surface of the protruding structure 104p or vertex of the protruding structure 104p.

In some embodiments, at least part of the light that passes through the light-guiding plate 102 can be adjusted by the protruding structures 104p of the light-guiding element 104, the optical path of the light is substantially concentrated to the positive viewing angle, and an included angle between the direction of the optical path of light (such as light $L_1$) and the normal direction Z of the panel 300 becomes smaller. Therefore, the contrast and/or brightness of the images in the positive viewing angle may be increased. The detailed aspect of the protruding structure 104p will be described later.

In some embodiments, the material of the base 104s or the protruding structure 104p of the light-guiding element 104 may include, but is not limited to, polycarbonate (PC), polyimide (PI), and polyethylene terephthalate (PET), polyether polyol (POP), polymethylmethacrylate (PMMA), cycloolefin polymer (COP), rubber, glass, other suitable materials or a combination thereof. In some embodiments, the material of the protruding structure 104p may include, but is not limited to, a photo-curable adhesive, a thermal-curable adhesive, a photo-thermal-curable adhesive, a moisture-curable adhesive, other suitable materials or a combination thereof. In some embodiments, the material of the protruding structure 104p may include, but is not limited to, optical clear adhesive (OCA), optical clear resin (OCR), acrylic resin, other suitable materials or a combination thereof.

Figure 2A:
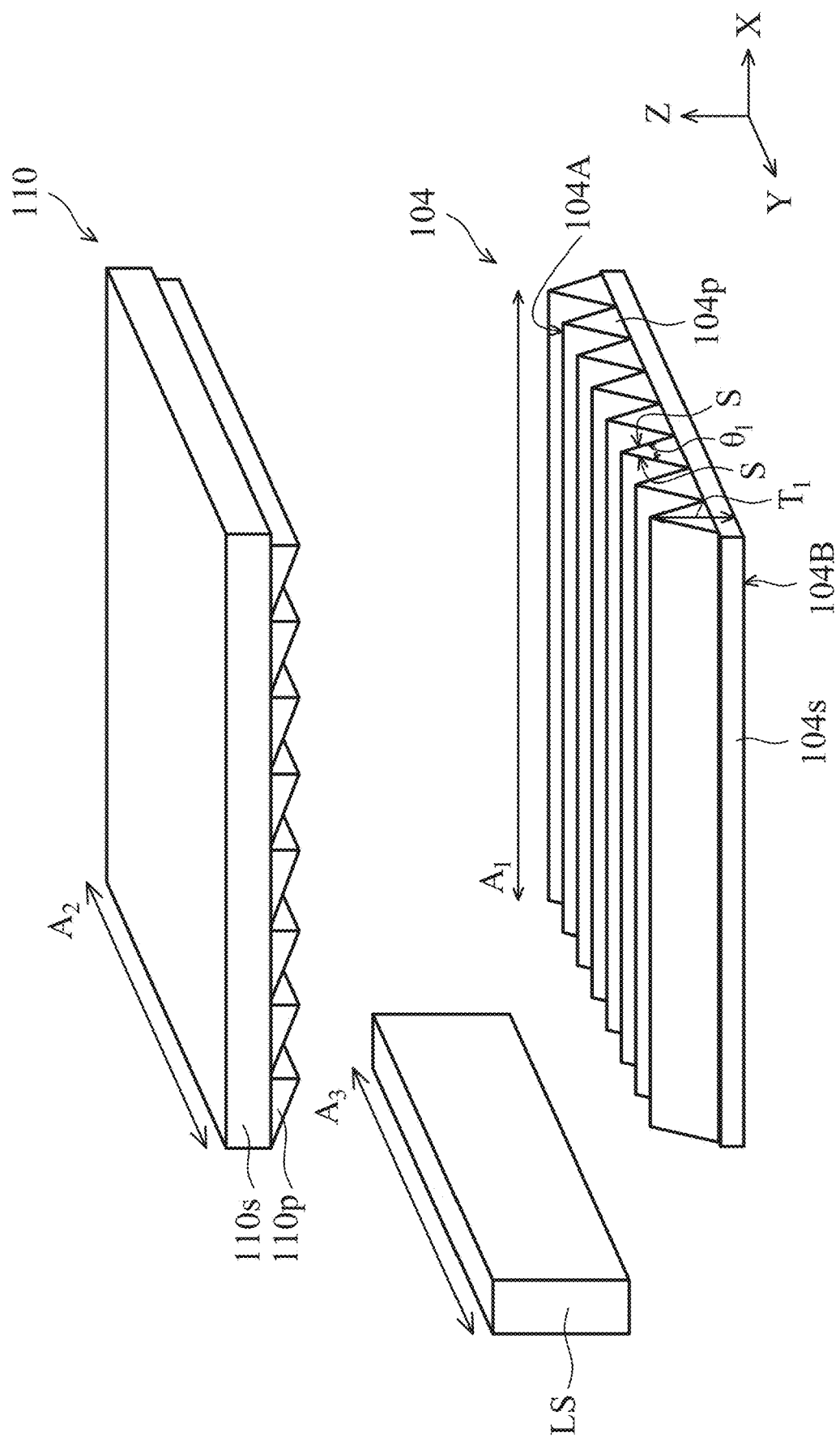
FIG. 2A is a schematic diagram of the configuration of some components of a backlight module of an electronic device in accordance with some embodiments of the present disclosure.

Refer to FIG. 1A or FIG. 2A. In some embodiments, the light-guiding element 104 may have a thickness $T_1$, and the thickness $T_1$ of the light-guiding element 104 may be in a range from 50 micrometers (μm) to 300 micrometers (50 micrometers≤thickness $T_1$≤300 micrometers), but it is not limited thereto. The thickness $T_1$ refers to a maximum thickness of the light-guiding element 104 in the normal direction Z of the panel 300, that is, the maximum distance between the bottom 104B and the top 104A. It should be noted that, the thickness of a layer as described above or as follows is defined by the maximum thickness of the layer in the normal direction Z of the panel 300. In addition, the maximum thickness can be measured from an image obtained by a scanning electron microscope (SEM) in any cross-section. For example, the A layer (the object to be measured) is located between the B layer and the C layer, and the SEM image may need to show the A layer, at least part of the B layer and at least part of the C layer, and the maximum thickness of the A layer measured in this SEM image is taken as the thickness of the A layer, but it is not limited thereto. In some embodiments, the light source LS may include an inorganic light-emitting diode, an organic light-emitting diode, an electroluminescence element, other suitable light-emitting elements or a combination thereof, but it is not limited thereto. Furthermore, the inorganic light-emitting diode may include, for example, light-emitting diode (LED), mini light-emitting diode (mini LED), micro light-emitting diode (micro LED), quantum dot light-emitting diode (QD-LED), other suitable light sources or a combination thereof, but it is not limited thereto. In some embodiments, the material of the light source LS may include, but is not limited to, a fluorescent material, a phosphor material, a quantum dot (QD) material or other suitable materials.

Referring to FIG. 1A, in some embodiments, the backlight module 100 may include a frame 120, and the components of the backlight module 100 may be disposed therein, but it is not limited thereto. In some embodiments, the material of the frame 120 may include, but is not limited to, metal, plastic, ceramic, other suitable materials, or a combination thereof. In some embodiments, the backlight module 100 may comprise an absorption layer 106, and the absorption layer 106 may be disposed under the light-guiding plate 102 and corresponds to the display area DA. In some embodiments, the light-guiding element 104 is disposed between the light-guiding plate 102 and the absorption layer 106 . In some embodiments, the absorption layer 106 may be formed on the bottom 104B of the light-guiding element 104. In some embodiments, the absorption layer 106 may be disposed on the frame 120 (e.g., the bottom surface 120B of the frame 120). In some embodiments, the absorption layer 106 may be disposed between the bottom 104B of the light-guiding element 104 and the frame 120 (or other elements). It should be noted that the aspect of the protruding structure 104p shown in FIG. 1A is for illustration, and the relationship between the extension direction of the protruding structure 104p and the light source LS will be described in detail later.

Referring to FIG. 1A, in some embodiments, the absorption layer 106 may be disposed corresponding to the display area DA, that is, the absorption layer 106 at least partially overlap with the display area DA in the normal direction Z of the panel 300. In some embodiments, the absorption layer 106 may be disposed corresponding to the non-display area NA, that is, the absorption layer 106 may at least partially overlap with the non-display area NA in the normal direction Z of the panel 300. For example, the absorption layer 106 can absorb at least part of the light $L_2$ transmitted through the light-guiding plate 102 (e.g., the bottom surface of the light-guiding plate 102 that is away from the panel 300) and/or the light-guiding element 104 (e.g., the base 104s). It should be noted that the light $L_2$ may be the aforementioned interference light, which may affect the contrast of the image or the brightness (or luminance) of the image in the positive viewing angle, or reduce the HDR effect. In accordance with the embodiments, the absorption layer 106 can absorb at least part of the interference light, reduce the influence of the interference light on the image, increase the contrast when seen from the positive viewing angle (or center viewing angle), or increase the brightness (or luminance) when seen from the positive viewing angle. For example, the normal direction Z of the panel 300 is defined as 0 degree, and the positive viewing angle is within a range of about plus or minus 30 degrees (or 40 degrees) in respect to the normal direction Z of the panel 300, but it is not limited thereto. In some embodiments, the reflectivity of the absorption layer 106 may be in a range from 0% to 25% (0%<reflectivity≤25%), or from 0% to 10% (0%<reflectivity≤10%), or from 0% to 5% (0%<reflectivity≤5%), but it is not limited thereto. In some embodiments, the absorption rate of the absorption layer 106 may be in a range from 75% to 100% (75%≤absorption rate<100%), or from 90% to 100% (90%≤absorption rate<100%), or from 95% to 100% (95%≤absorption rate<100%), but it is not limited thereto. In some embodiments, the material of the absorption layer 106 may include, but is not limited to, a material with a high absorption rate, a material with a low reflectivity or a combination thereof. In some embodiments, the material of the absorption layer 106 may include particles, paint, glue, other suitable materials or a combination thereof, but it is not limited thereto. In some embodiments, the absorption layer 106 may include, but is not limited to, black organic material, black inorganic material, polyethylene terephthalate, black ink, black tape, other suitable materials or a combination thereof. In some embodiments, the absorption layer 106 may be formed by a chemical vapor deposition process, a coating process, an evaporation process, an electroplating process, a sputtering process, a coating process, a printing process, a baking paint process or other suitable processes, but it is not limited thereto.

Referring to FIG. 1A, in some embodiments, the absorption layer 106 may be directly formed on or adhered on the frame 120, and the absorption layer 106 may at least partially absorb interference light, or may reduce the overall thickness of the backlight module 100. In some embodiments, in a privacy (anti-peeping) electronic device, when the backlight module 100 of the electronic device has the absorption layer 106, other privacy films disposed on the panel 300 can be optionally omitted, which can reduce the manufacturing cost or reduce the thickness of electronic device.

Referring to FIG. 1A, in some embodiments, the thickness $T_2$ of the absorption layer 106 may be in a range from 1 micrometer (μm) to 300 micrometers (1 micrometer≤thickness $T_2$≤300 micrometers), from 1 micrometer to 200 micrometers (1 micrometer≤thickness $T_2$≤200 micrometers), from 3 micrometers to 190 micrometers (3 micrometers≤thickness $T_2$≤190 micrometers), or from 10 micrometers to 150 micrometers (10 micrometers≤thickness $T_2$≤150 micrometers), but it is not limited thereto. The thickness $T_2$ refers to a maximum thickness of the absorption layer 106 in the normal direction Z of the panel 300.

Referring to FIG. 1A, in some embodiments, the air 108 may be exists or located between the light-guiding element 104 and the light-guiding plate 102. In some embodiments (not illustrated), an adhesive element may be disposed between the light-guiding element 104 and the light-guiding plate 102 to adhere the light-guiding element 104 and the light-guiding plate 102 together. In some embodiments, the backlight module 100 may include a light-adjusting element 110 disposed on the light-guiding plate 102, and the light-adjusting element 110 may be disposed between the light-guiding plate 102 and the panel 300. In some embodiments, the light-adjusting element 110 may be in contact with or not in contact with the light-guiding plate 102. In some embodiments, an adhesive element (not illustrated in FIG. 1A) may be disposed between the light-adjusting element 110 and the light-guiding plate 102 to adhere the two together. The light-adjusting element 110 can be used to adjust the optical path of the light (for example, the angle of light scattering), such as the optical path modulation of the light $L_1$, or to increase the brightness of the image in a positive viewing angle, but it is not limited thereto. In some embodiments, the light-adjusting element 110 may include a turning film structure. In some embodiments, a diffuser (not illustrated) may be disposed on the light-adjusting element 110 according to requirement for improving the viewing angle, but it is not limited thereto. In some embodiments, the light-adjusting element 110 may have a base 110s and a protruding structure 110p disposed on the base 110s, and the protruding structure 110p of the light-adjusting element 110 may face the light-guiding plate 102, and the protruding structure 110p of the light-adjusting element 110 may be disposed or arranged opposite to the protruding structure 104p of the light-guiding element 104. In some embodiments, the material of the base 110s of the light-adjusting element 110 may be the same as or different from the material of the base 104s of the light-guiding element 104 described above. In some embodiments, the material of the protruding structure 110p of the light-adjusting element 110 may be the same as or different from the material of the protruding structure 104p of the light-guiding element 104.

Referring to FIG. 1A, in some embodiments, the backlight module 100 may include a circuit board 122, and the circuit board 122 may be disposed on the frame 120. In some embodiments, the circuit board 122 may include a rigid circuit board (such as a printed circuit board (PCB)) or a flexible circuit board (such as a flexible printed circuit (FPC)), and the circuit board 122 may include an active driving element or a passive driving element disposed thereon, but the present disclosure is not limited thereto. In accordance with some embodiments, the backlight module 100 may include a fixing element 124 and/or a reflective element 126. In some embodiments, the fixing element 124 may be disposed between the circuit board 122 and the light-guiding plate 102, and the circuit board 122 and the light-guiding plate 102 may be fixed through the fixing element 124. In some embodiments, the fixing element 124 may include an adhesive material, such as a photo-curable adhesive, a thermal-curable adhesive, a photo-thermal-curable adhesive, a moisture-curable adhesive, other suitable materials or a combination thereof, but it is not limited thereto. In some embodiments, the material of the protruding structure 104p may include optical transparent glue, optical transparent resin, acrylic resin, other suitable materials or a combination thereof.

Referring to FIG. 1A, in some embodiments, the reflective element 126 may be disposed adjacent to the light source LS and/or the light incident side of part of the light-guiding plate 102. In some embodiments, the reflective element 126 may be disposed on the light source LS and/or the light incident side of part of the light-guiding plate 102. In some embodiments, the reflective element 126 may overlap with the light source LS and/or the light incident side of part of the light-guiding plate 102 in the normal direction Z of the panel 300. In some embodiments, the reflective element 126 may include a material with a high reflectivity, for example, a material with a reflectivity between 70% and 99% (70%≤reflectivity≤99%). In some embodiments, the material of the reflective element 126 may include, but is not limited to, metal, white ink, white tape, other suitable reflective materials or a combination thereof. The reflective element 126 can be used to reflect the light generated by the light source LS to the light-guiding plate 102, thereby reducing light loss or light leakage, or increasing the brightness of the electronic device.

Referring to FIG. 1A, in some embodiments, a spacer 320 may be disposed between the panel 300 and the backlight module 100. In some embodiments, the spacer element 320 may include, but is not limited to, an insulating material, a buffer material, a protective material, an adhesive material, other suitable materials or a combination thereof.

Figure 1B:
FIG. 1B is an optical analysis result graph of an electronic device in accordance with some embodiments of the present disclosure.

Refer to FIG. 1B, which is an optical analysis result graph (for example, of the electronic device 10 of FIG. 1A) in some embodiments. The optical analysis result graph can be obtained by a conoscopic lens, but it is not limited thereto. For example, the optical analysis result graph may be measured or analyzed using Conoscope, BM5A, Conometer80U or other suitable instruments, but it is not limited thereto. As shown in FIG. 1B, the color scale at the right side represents different the brightness per unit area; and according to the result shown in the left side, the innermost circle (including the center point) substantially corresponds to a range from 1.5E+03 cd/m$^2$ to 1.3E+03 cd/m$^2$, the second inner circle substantially corresponds to a range from 1.3E+03 cd/m$^2$ to 780 cd/m$^2$, the third inner circle substantially corresponds to a range from 780 cd/m$^2$ to 565 cd/m$^2$, and the fourth inner circle substantially corresponds to 565 cd/m$^2$ to 133 cd/m$^2$, and the outermost circle substantially corresponds to a range from 133 cd/m$^2$ to 1.48 cd/m$^2$, but it is not limited thereto. In the range where the angle θ is 40 degrees or less, or even 30 degrees or less, the bearing angle φ between 0 and 360 degrees shows a relatively high brightness distribution per unit area (cd/m$^2$). The angle θ is an inclined angle in respect to the normal direction Z of the panel 300, and a direction of the bearing angle φ is parallel to the upper surface of the panel 300. For example, as shown in FIG. 1B, for the angle θ of 0 degrees to 20 degrees, the brightness per unit area (cd/m$^2$) varies from the range of 1.5E+03 cd/m$^2$ to 1.3E+03 cd/m$^2$ to the range of 780 cd/m$^2$ to 565 cd/m$^2$, but it is not limited thereto. In addition, as shown in FIG. 1B, for the angle θ of 20 degrees to 80 degrees, the brightness per unit area (cd/m$^2$) is substantially in the range of 565 cd/m$^2$ to 133 cd/m$^2$, but it is not limited thereto. Therefore, the structural configuration of the electronic device 10 can make it have high brightness and/or high contrast (the ratio between the bright state and the dark state) under the positive viewing angle, the electronic device 10 can be applied to the full viewing angle privacy (anti-peeping), but it is not limited thereto. It should be noted that, the above values of the brightness per unit area (cd/m$^2$) of the electronic device are results of an exemplary embodiment, but the present disclosure is not limited thereto. The value of the brightness per unit area may vary based on the design of the panel 300, the material of the display layer 302c or other factors.

In addition, for the configuration of the light-guiding element 104 and the light-adjusting element 110 of the electronic device in the optical analysis result graph of FIG. 1B may refer to those shown in FIG. 2A. FIG. 2A is a schematic diagram of the configuration of some components (such as the light-guiding element 104, the light-adjusting element 110, and the light source LS) of the backlight module 100 in some embodiments. For example, the protruding structure 104p (e.g., the prism structure) of the light-guiding element 104 may extend along a first direction $A_1$, and the protruding structure 110p (e.g., the inverted prism structure) of the light-adjusting element 110 may extend along a second direction $A_2$, and the light source LS may extend along a third direction $A_3$. As shown in FIG. 2A, the first direction $A_1$ is substantially perpendicular to the second direction $A_2$, and the first direction $A_1$ is substantially perpendicular to the third direction $A_3$. The first direction $A_1$ substantially corresponds to the direction of bearing angle φ at 90 and 270 degrees in the optical analysis graph of FIG. 1B, but it is not limited thereto.

In some embodiments, the first direction $A_1$ is different from the second direction $A_2$. In some embodiments, the first direction $A_1$ is the same as the second direction $A_2$. In some embodiments, the included angle (not illustrated) between the first direction $A_1$ and the second direction $A_2$ may be in a range from 0 degree to 90 degrees (0 degree≤included angle≤90 degrees). In some embodiments, the included angle (not illustrated) between the first direction $A_1$ and the second direction $A_2$ may be in a range from 80 degrees to 90 degrees (80 degrees≤included angle≤90 degrees), that is, the first direction $A_1$ is substantially perpendicular to the second direction $A_2$. In some embodiments, the included angle (not illustrated) between the first direction $A_1$ and the second direction $A_2$ may be in a range from 0 degree to 10 degrees (0 degree≤included angle≤10 degrees), that is, the first direction $A_1$ is substantially the same as the second direction $A_2$.

In some embodiments, the first direction $A_1$ is different from the third direction $A_3$. In some embodiments, the first direction $A_1$ is the same as the third direction $A_3$. In some embodiments, the included angle (not illustrated) between the first direction $A_1$ and the third direction $A_3$ may be in a range from 0 degree to 90 degrees (0 degree≤included angle≤90 degrees). In some embodiments, the included angle (not illustrated) between the first direction $A_1$ and the third direction $A_3$ may be in a range from 80 degrees to 90 degrees (80 degrees≤included angle≤90 degrees), that is, the first direction $A_1$ is substantially perpendicular to the third direction $A_3$. In some embodiments (as shown in FIG. 2A), the included angle (not illustrated) between the first direction $A_1$ and the third direction $A_3$ may be in a range from 0 degree to 10 degrees (0 degree≤included angle≤10 degrees, that is, the first direction $A_1$ is substantially the same as the third direction $A_3$.

In some embodiments, the second direction $A_2$ is different from the third direction $A_3$. In some embodiments, the second direction $A_2$ is the same as the third direction $A_3$. In some embodiments, the included angle (not illustrated) between the second direction $A_2$ and the third direction $A_3$ may be in a range from 0 degree to 90 degrees (0 degree≤included angle≤90 degrees). In some embodiments, the included angle (not illustrated) between the second direction $A_2$ and the third direction $A_3$ may be in a range from 80 degrees to 90 degrees (80 degrees≤included angle≤90 degrees), that is, the second direction $A_2$ is substantially perpendicular to the third direction $A_3$. In some embodiments, the included angle (not illustrated) between the second direction $A_2$ and the third direction $A_3$ may be in a range from 0 degree to 10 degrees (0 degree≤included angle≤10 degrees), that is, the second direction $A_2$ is substantially the same as the third direction $A_3$.

It should be noted that, the included angles between the first direction $A_1$, the second direction $A_2$, and/or the third direction $A_3$ in the electronic device can be adjusted according to needs, so as to modulate the angle of the emitting light of the panel 300, or to modulate the brightness under different viewing angles.

Referring to FIG. 2A, in some embodiments, the protruding structure 104p of the light-guiding element 104 may include a sharp-angled structure. In some embodiments, the sharp-angled structure may have a vertex angle $\theta_1$. In some embodiments, the vertex angle $\theta_1$ may be in a range from 45 degrees to 120 degrees (45 degrees≤vertex angle $\theta_1$≤120 degrees), or from 65 degrees to 100 degrees (65 degrees≤vertex angle $\theta_1$≤100 degrees), for example, 70 degrees, 75 degrees, 80 degrees, 85 degrees, 90 degrees or 95 degrees. The vertex angle $\theta_1$ can be defined by the included angle form between the top 104A and the adjacent sides S.

In addition, refer to FIG. 2B and FIG. 2C, which are structural schematic diagrams of the light-guiding element 104 in some embodiments. As shown in FIG. 2B and FIG. 2C, in some other embodiments, the protruding structure 104p of the light-guiding element 104 may include an obtuse angle structure (as shown in FIG. 2B), a trapezoidal structure (as shown in FIG. 2C), other suitable structures, or a combination thereof. As shown in FIG. 2C, in some embodiments, the trapezoidal structure may have a virtual vertex angle $\theta_3$. In some embodiments, the virtual vertex angle $\theta_3$ may be in a range from 45 degrees to 120 degrees (45 degrees≤vertex angle $\theta_3$≤120 degrees), or from 65 degrees to 100 degrees (65 degrees≤vertex angle $\theta_3$≤100 degrees), for example, 70 degrees, 75 degrees, 80 degrees, 85 degrees, 90 degrees, or 95 degrees. In some embodiments (as shown in FIG. 2C), the virtual vertex angle $\theta_3$ may be defined by the included angle formed between the top 104A of the protruding structure 104p and the extension lines EL of the two adjacent sides S. The protruding structures 104p shown in FIGS. 2A to 2C described above are tapered structures. However, it should be understood that the specific shape of the protruding structure 104p of the light-guiding element 104 is not limited to those shown in the foregoing embodiments, and those skilled in the art can select the tapered structure (as described above) with a suitable shape according to needs as the protruding structure 104p.

Figure 3A:
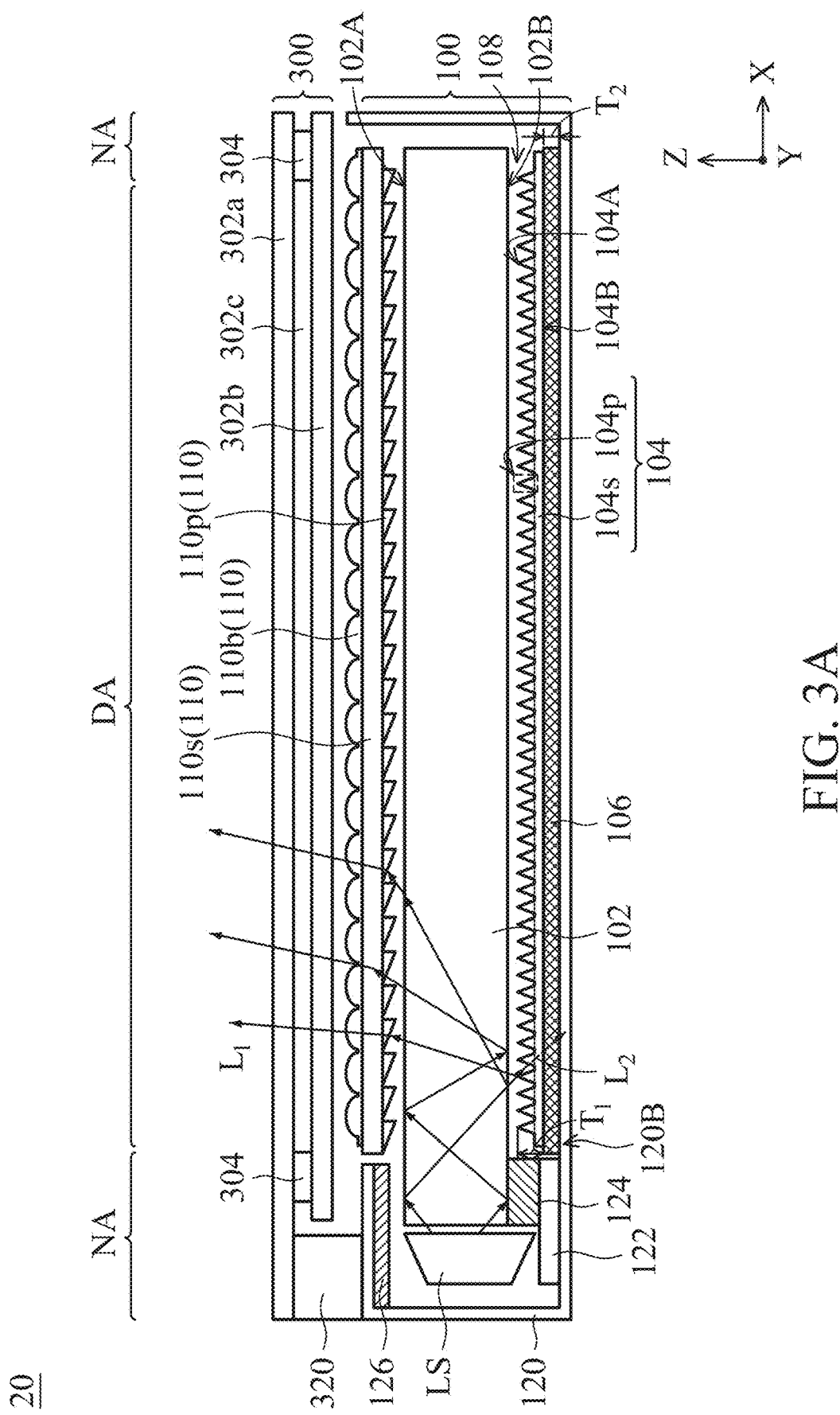
FIG. 3A is a cross-sectional schematic diagram of an electronic device in accordance with some embodiments of the present disclosure.

Refer to FIG. 3A, which is a cross-sectional schematic diagram of an electronic device 20 in accordance with some other embodiments of the present disclosure. It should be understood that the same or similar components or elements in above and below contexts are represented by the same or similar reference numerals. The materials, manufacturing methods and functions of these components or elements are the same or similar to those described above, and thus will not be repeated herein.

The electronic device 20 shown in FIG. 3A is substantially similar to the electronic device 10 shown in FIG. 1A. The difference between them includes that the light-adjusting element 110 in the electronic device 20 may comprise the protruding structure 110p (for example, an inverted prism structure), the base 110s and an optical structure 110b, the optical structure 110b and the protruding structure 110p are respectively disposed on opposite sides of the base 110s.

For example, the protruding structure 110p of the light-adjusting element 110 may face the light-guiding plate 102, and the optical structure 110b may be away from the light-guiding plate 102. In some embodiments, the optical structure 110b may be disposed between the panel 300 and the protruding structure 110p, and the optical structure 110b may face the panel 300. In some embodiments, the materials of the optical structure 110b may be the same as or different from the materials of the protruding structure 110p.

In some embodiments, the optical structure 110b may include a lenticular lens, a prism structure, a micro-lens structure, other suitable structures, or a combination thereof, but it is not limited thereto. In some embodiments, the optical structure 110b may include an obtuse angle structure (similar to the structure shown in FIG. 2B), a trapezoidal structure, or other suitable structures. In some embodiments, a haze of the optical structure 110b may be in a range from 50% to 99% (50%≤haze≤99%), for example, from 50% to 95% (50%≤haze≤95%), or from 60% to 95% (60%≤haze≤95%). In some embodiments, a roughness (Ra) of the optical structure 110b may be in a range from 0.3 micrometers to 0.75 micrometers (0.3 micrometers≤roughness (Ra)≤0.75 micrometers), for example, from 0.35 micrometers to 0.7 micrometers (0.35 micrometers≤roughness (Ra)≤0.7 micrometers) or from 0.4 micrometers to 0.65 micrometers (0.4 micrometers≤roughness (Ra)≤0.65 micrometers). In some embodiments, the optical structure 110b may be used to change the polarization characteristics of light, for example, the optical structure 110b may be used to increase the amount of light in the lateral direction (approximately the X direction), but it is not limited thereto. In other embodiments, the amount of light in other directions (for example, one of the directions on a plane perpendicular to the Z direction) can be increased through the optical structure 110b according to requirement. For example, in some embodiments, the optical structure 110b may be formed by the following steps: coating a material layer (not illustrated) on the base 110s; using an instrument having a microstructure to imprint the material layer; and then curing the material layer to form the optical structure 110b, but it is not limited thereto. In some embodiments, the material layer may include, but is not limited to, a photo-curable adhesive material, a thermal-curable adhesive material, a photo-thermal-curable adhesive material, other suitable materials or a combination thereof. In some embodiments, the instrument having a microstructure may include a roller with a microstructure on the surface or other suitable instruments.

In some embodiments, the structural appearance of the optical structure 110b may be the same as or different from the structural appearance of the protruding structure 110p. In some embodiments, the optical structure 110b may extend along a fourth direction $A_4$ (not illustrated). In some embodiments, the first direction $A_1$ (the extending direction of the protruding structure 104p of the light-guiding element 104) is substantially the same as the fourth direction $A_4$, that is, the included angle (not illustrated) between the first direction $A_1$ and the fourth direction $A_4$ may be in a range from 0 degree to 10 degrees (0 degree≤included angle≤10 degrees). In some embodiments, the first direction $A_1$ is different from the fourth direction $A_4$. In some embodiments, the included angle (not illustrated) between the first direction $A_1$ and the fourth direction $A_4$ may be in a range from 0 degree to 90 degrees (0 degree≤angle≤90 degrees). In some embodiments, the included angle between the first direction $A_1$ and the fourth direction $A_4$ may be in a range from 80 degrees to 90 degrees (80 degrees≤included angle≤90 degrees), that is, the first direction $A_1$ is substantially perpendicular to the fourth direction $A_4$. In such a configuration, the viewing angle range of the electronic device in the longitudinal direction may be increased, such as the luminance (or brightness) and/or contrast in the longitudinal viewing angle. In addition, as described above, in some embodiments, when the first direction $A_1$ is substantially the same as the fourth direction $A_4$, the viewing angle range of the electronic device in the lateral direction can be increased, such as the luminance (or brightness) and/or contrast in the lateral viewing angle. The viewing angle in the longitudinal direction refers to, for example, the angle range of the upper and lower sides of the electronic device. The viewing angle in the lateral direction refers to, for example, the angle range of the left and right sides of the electronic device.

It should be understood that although only one light-adjusting element 110 is illustrated in the drawings, in other embodiments, several light-adjusting elements 110 may be provided according to needs. In some embodiments, the light-adjusting element 110 may include a diffusion film, a brightness enhancement film, a dual brightness enhancement film (DBEF), or a combination thereof, but it is not limited thereto.

In some embodiments, the electronic device 10 may include at least one optical film (not illustrated) disposed between the panel 300 and the backlight module 100, and the optical film may include a reflective film, a diffusion film, a brightness enhancement film, and an inverted prism film, a dual brightness enhancement film (for example, 3M DBEF), other suitable optical films, or a combination thereof, but it is not limited thereto.

Figure 3B:
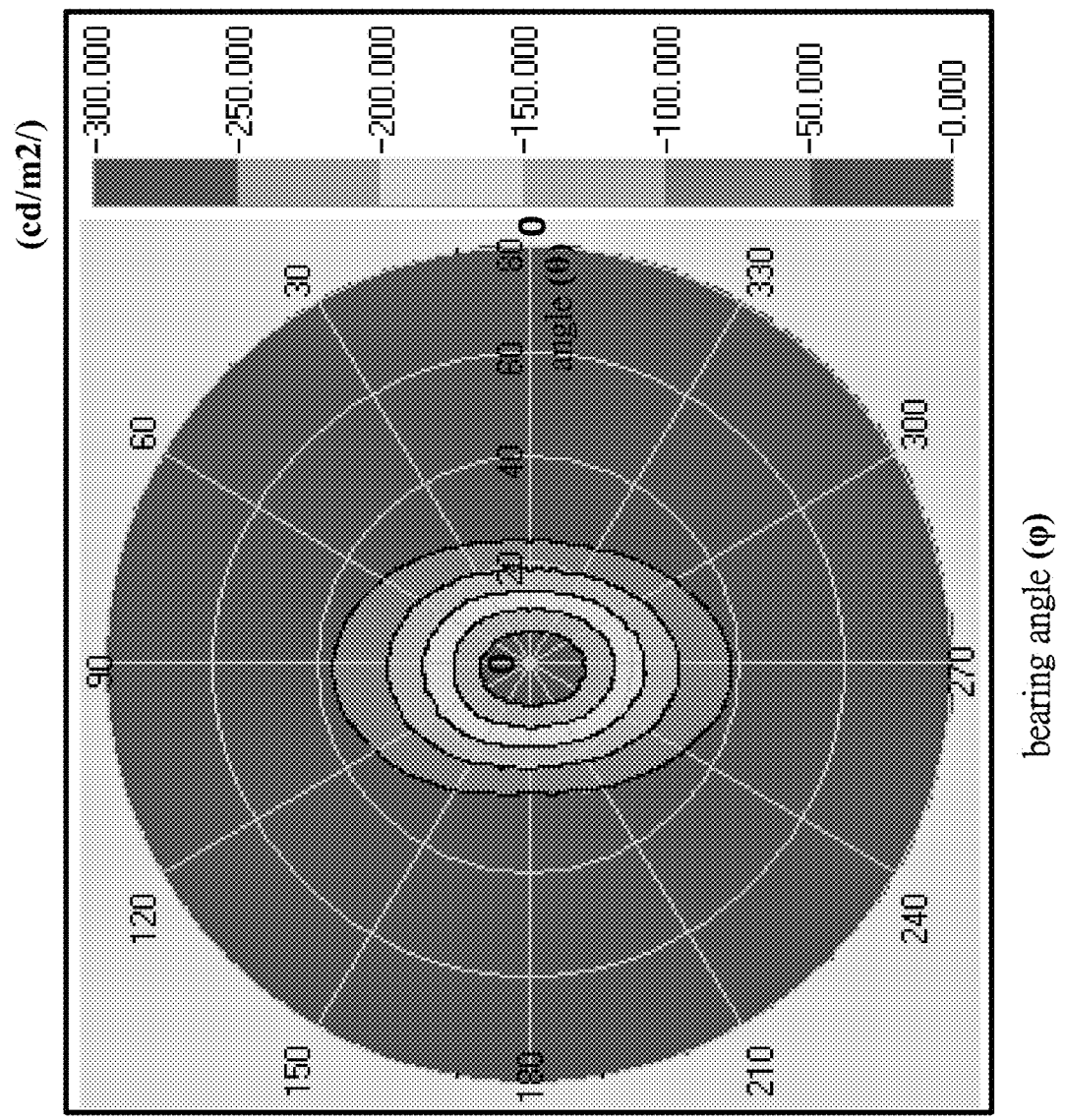
FIG. 3B is an optical analysis result graph of an electronic device in accordance with some embodiments of the present disclosure.

Refer to FIG. 3B, which is an optical analysis result graph of the electronic device 20 in accordance with some embodiments of the present disclosure (for example, the embodiment show in FIG. 3A). The measurement method or instrument is as described above. According to FIG. 3B, it can be known that the color scale at the right side represents different brightness per unit area; and according to the result shown in the left side, the innermost circle (including the center point) substantially corresponds to a range from 300 cd/m² to 250 cd/m², the second inner circle substantially corresponds to a range from 250 cd/m² to 200 cd/m², the third inner circle substantially corresponds to a range from 200 cd/m² to 150 cd/m², the fourth inner circle substantially corresponds to 150 cd/m² to 100 cd/m², the fifth inner circle substantially corresponds to 100 cd/m² to 50 cd/m², and the outermost circle substantially corresponds to a range from 50 cd/m² to 0 cd/m², but it is not limited thereto. In the range where the angle θ is 40 degrees or less, or even 30 degrees or less, the distribution of the brightness per unit area is higher. For example, as shown in FIG. 3B, for the angle θ of 0 degree to 20 degrees, the brightness per unit area (cd/m²) varies from the range of 300 cd/m² to 250 cd/m² to the range of 150 cd/m², but it is not limited thereto. In addition, as shown in FIG. 1B, for the angle θ of 20 degrees to 80 degrees, the brightness per unit area (cd/m²) is, for example, approximately 100 cd/m² to 0 cd/m², but it is not limited thereto. In addition, for the bearing angle φ ranged from 60 degrees to 120 degrees and/or the bearing angle φ ranged from 240 degrees to 300 degrees shown in FIG. 3B, the brightness per unit area in above range is relatively higher than that of other range of the bearing angles φ. Therefore, the electronic device having a configuration can be applied to an electronic device with privacy (anti-peeping function) in the lateral viewing angle, or the range of the viewing angle in the longitudinal direction can be increased as described above, but it is not limited thereto. It should be noted that the above values of the brightness per unit area of the electronic device are results of an exemplary embodiment, but the present disclosure is not limited thereto. The value of the brightness per unit area may be varied based on the design of the panel 300, the material of the display layer 302c or other factors.

In addition, for the configuration of the protruding structure 104p (e.g., the inverted prism structure) of the light-guiding element 104 and the protruding structure 110p (e.g., the inverted prism structure) of the light-adjusting element 110 of the electronic device in the optical analysis result graph of FIG. 3B may refer to those shown in FIG. 2A. In addition, the light-adjusting element 110 may further include the optical structure 110b of FIG. 3A. The extension direction of the optical structure 110b is substantially parallel to the protruding structure 104p of the light-guiding element 104, but it is not limited thereto.

Figure 4:
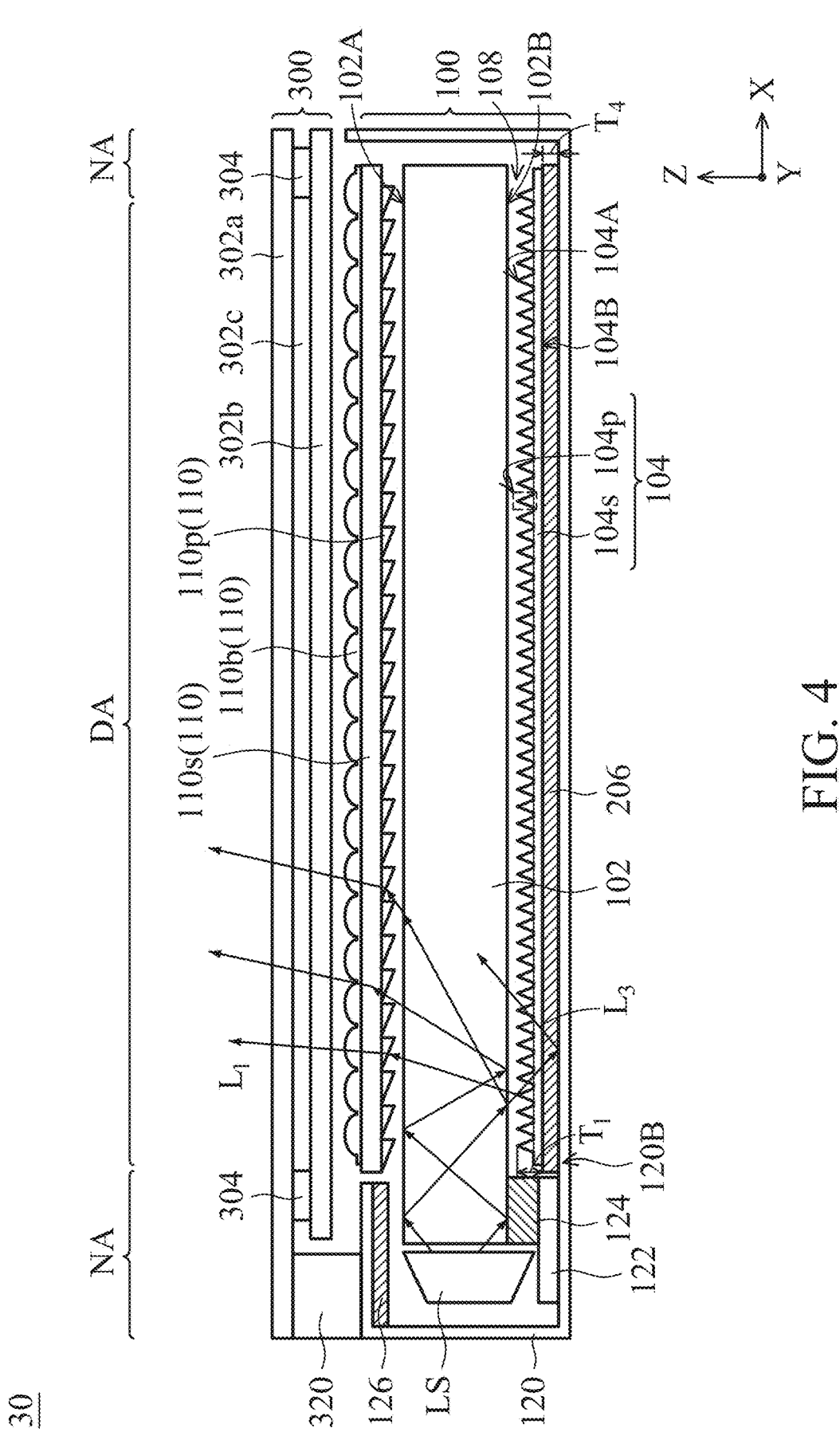
FIG. 4 is a cross-sectional schematic diagram of an electronic device in accordance with some embodiments of the present disclosure.

Refer to FIG. 4, which is a cross-sectional schematic diagram of an electronic device 30 in accordance with some other embodiments of the present disclosure. The electronic device 30 shown in FIG. 4 is substantially similar to the electronic device 10 shown in FIG. 1A. The difference between them includes that in the electronic device 30, a reflective layer 206 may be used to replace the absorption layer 106. In other words, in some embodiments, the electronic device 30 may not have the absorption layer 106. In some embodiments, the backlight module further comprises a reflective layer 206, the light-guiding element 104 may be disposed between the reflective layer 206 and the light-guiding plate 102. In some embodiments, the light-guiding element 104 may be fixed (or attached) on the reflective layer 206. For example, in some embodiments, the reflective layer 206 may be disposed corresponding to the display area DA. In some embodiments, in the normal direction Z of the panel 300, the reflective layer 206 may at least partially overlap the display area DA. In some embodiments, the reflective layer 206 may be disposed corresponding to the non-display area NA. In some embodiments, in the normal direction Z of the panel 300, the reflective layer 206 may at least partially overlap the non-display area NA. The reflective layer 206 can reflect the light that is not reflected by the light-guiding element 104 to the light-guiding plate 102 or the light that penetrates through the bottom of the light-guiding element 104, as the light $L_3$ shown in the drawing, which may increase the utilization rate of light or enhance the brightness of the image. In some embodiments, the reflective layer 206 may include a material with a high reflectivity (for example, reflectivity is in a range from 80% to 99%). In some embodiments, the material with a high reflectivity may be disposed on the surface of the substrate or in the substrate, but it is not limited thereto. In some embodiments, the substrate may include organic materials, inorganic materials or a combination thereof. In some embodiments, the material with a high reflectivity may include, but is not limited to, silver (Ag), aluminum (Al), titanium (Ti), titanium dioxide ($TiO_2$), other suitable materials or a combination thereof.

Referring to FIG. 4, in some embodiments, the reflective layer 206 may have a thickness $T_4$. In some embodiments, the thickness $T_4$ of the reflective layer 206 may be in a range from 1 micrometers to 200 micrometers (1 micrometers≤thickness $T_4$≤200 micrometers), or from 3 micrometers to 190 micrometers (3 micrometers≤thickness $T_4$≤190 micrometers), for example, 5 micrometers, 10 micrometers, 20 micrometers, 30 micrometers, 40 micrometers, 50 micrometers or 60 micrometers. In some embodiments, the thickness $T_4$ is defined by the maximum thickness of the reflective layer 206 in the normal direction Z of the panel 300.

Figure 5:
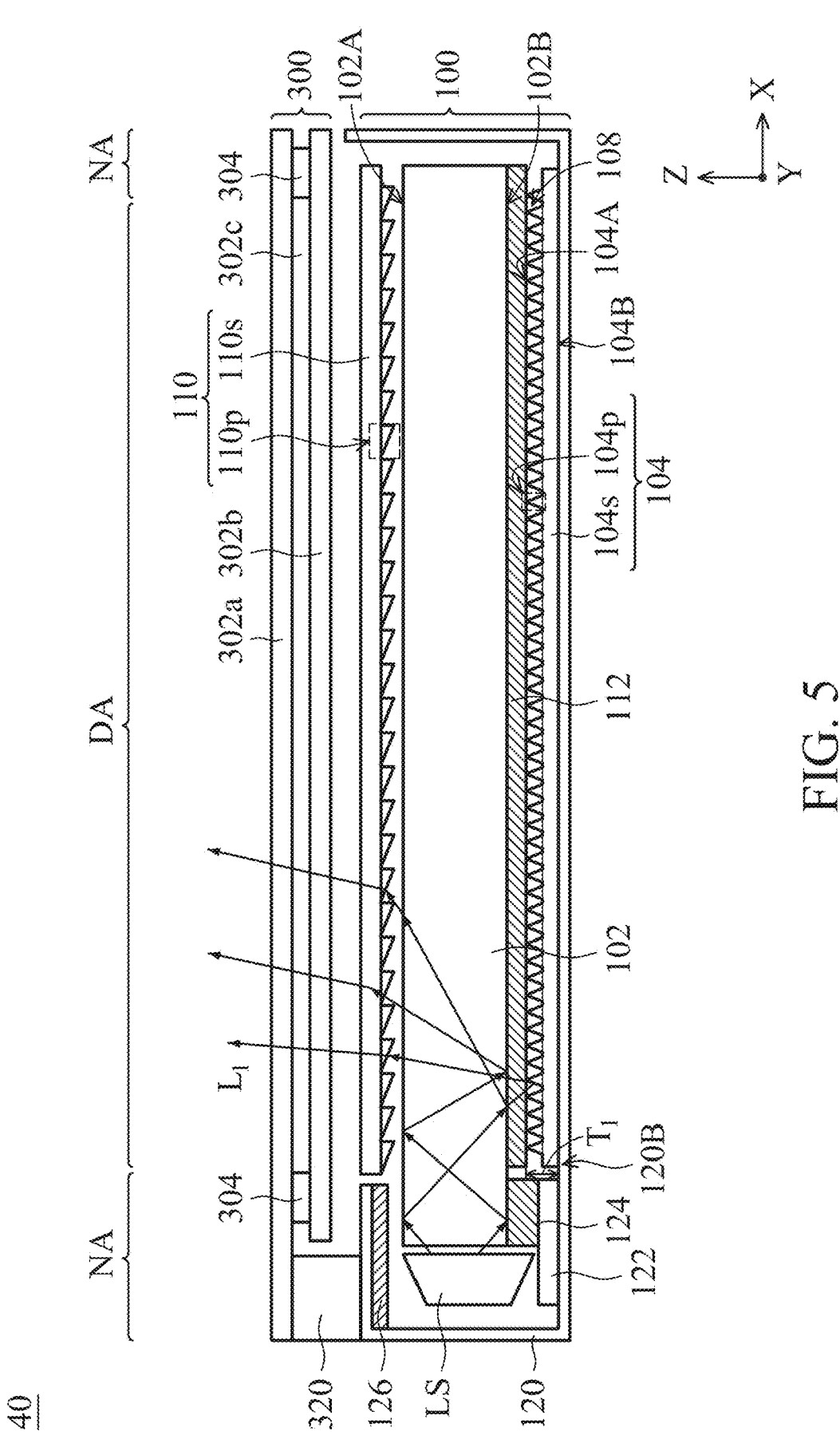
FIG. 5 is a cross-sectional schematic diagram of an electronic device in accordance with some embodiments of the present disclosure.

Refer to FIG. 5, which is a cross-sectional schematic diagram of an electronic device 40 in accordance with some other embodiments of the present disclosure. The electronic device 40 shown in FIG. 5 is substantially similar to the electronic device 10 shown in FIG. 1A. The difference between them includes that the electronic device 40 may further include an adhesive element 112. As shown in FIG. 5, the adhesive element 112 may be disposed between the light-guiding element 104 and the light-guiding plate 102 to adhere the light-guiding element 104 and the light-guiding plate 102 together. In some embodiments, the air 108 may exist between the light-guiding element 104 and the light-guiding plate 102 after adherence, but it is not limited thereto. The adhesive element 112 can integrate components to simplify the assembly process, or reduce the risk of collision or scratches between components. In some embodiments, the adhesive element 112 may include, but is not limited to, a photo-curable adhesive, a thermal-curable adhesive, a photo-thermal-curable adhesive, a moisture-curable adhesive, a tape, other suitable materials or a combination thereof. In some embodiments, the adhesive element 112 may include, but is not limited to, optical clear adhesive (OCA), optical clear resin (OCR), other suitable materials or a combination thereof.

Referring to FIG. 5, in some embodiments, the electronic device 40 may or may not have the absorption layer 106 and/or the reflective layer 206, but the light-guiding element 104 may be disposed under the light-guiding plate 102. In some embodiments, the light-guiding element 104 may be fixed (or attached) on the frame 120, and the light-guiding element 104 and the frame 120 may be fixed or attached together by an adhesive element (not illustrated), but it is not limited thereto.

Figure 6:
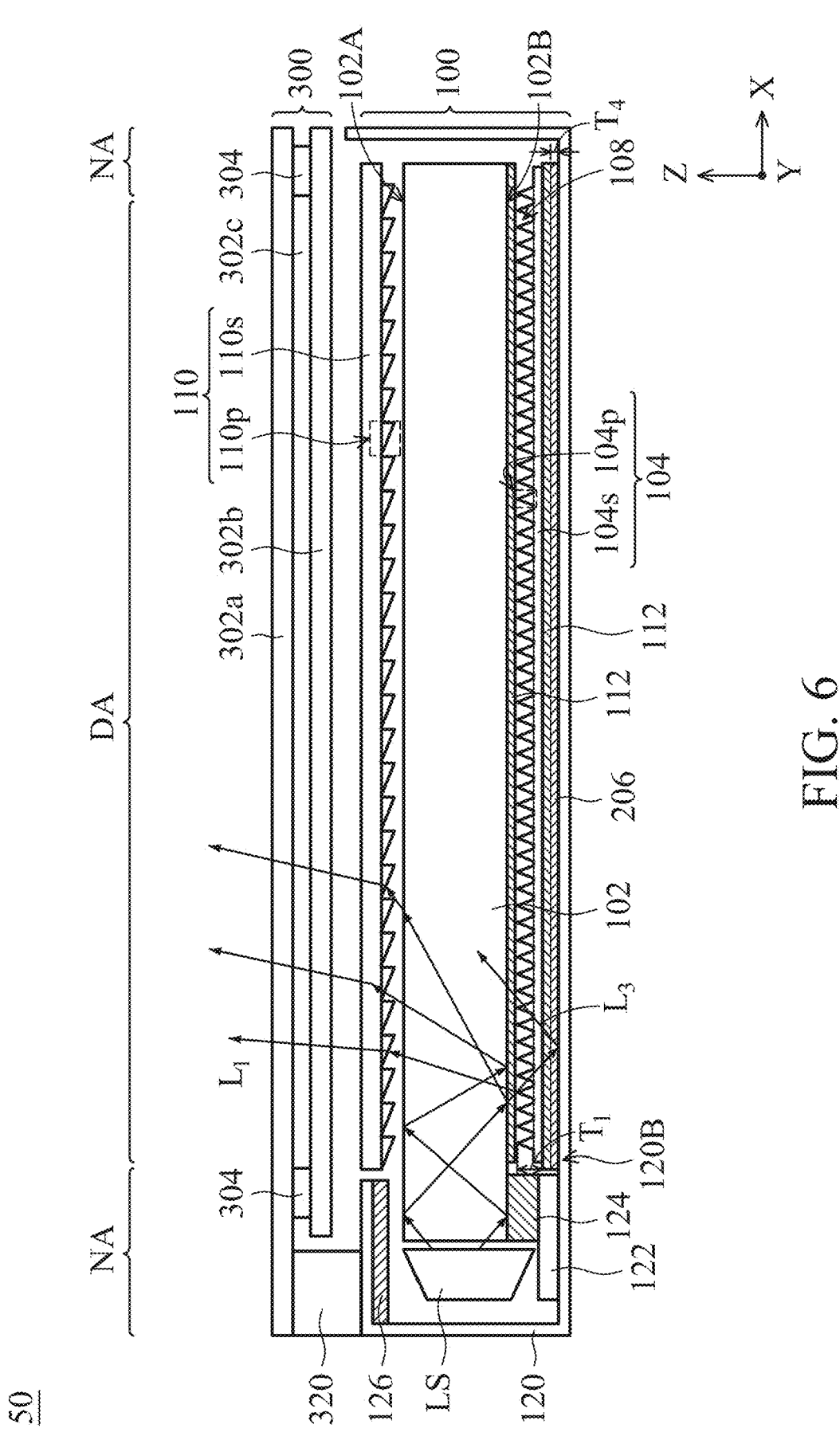
FIG. 6 is a cross-sectional schematic diagram of an electronic device in accordance with some embodiments of the present disclosure.

Refer to FIG. 6, which is a cross-sectional schematic diagram of an electronic device 50 in accordance with some other embodiments of the present disclosure. The electronic device 50 shown in FIG. 6 is similar to the electronic device 40 shown in FIG. 5, the difference between them includes that the electronic device 50 may have the reflective layer 206, and the adhesive element 112 may be disposed between the light-guiding element 104 and the reflective layer 206, the light-guiding element 104 (e.g., the base 104s) can be adhered to the reflective layer 206. The arrangement of the adhesive element 112 can reduce the relative positional shifting of the light-guiding element 104 and the reflective layer 206, or reduce the assembly procedure.

Figure 7:
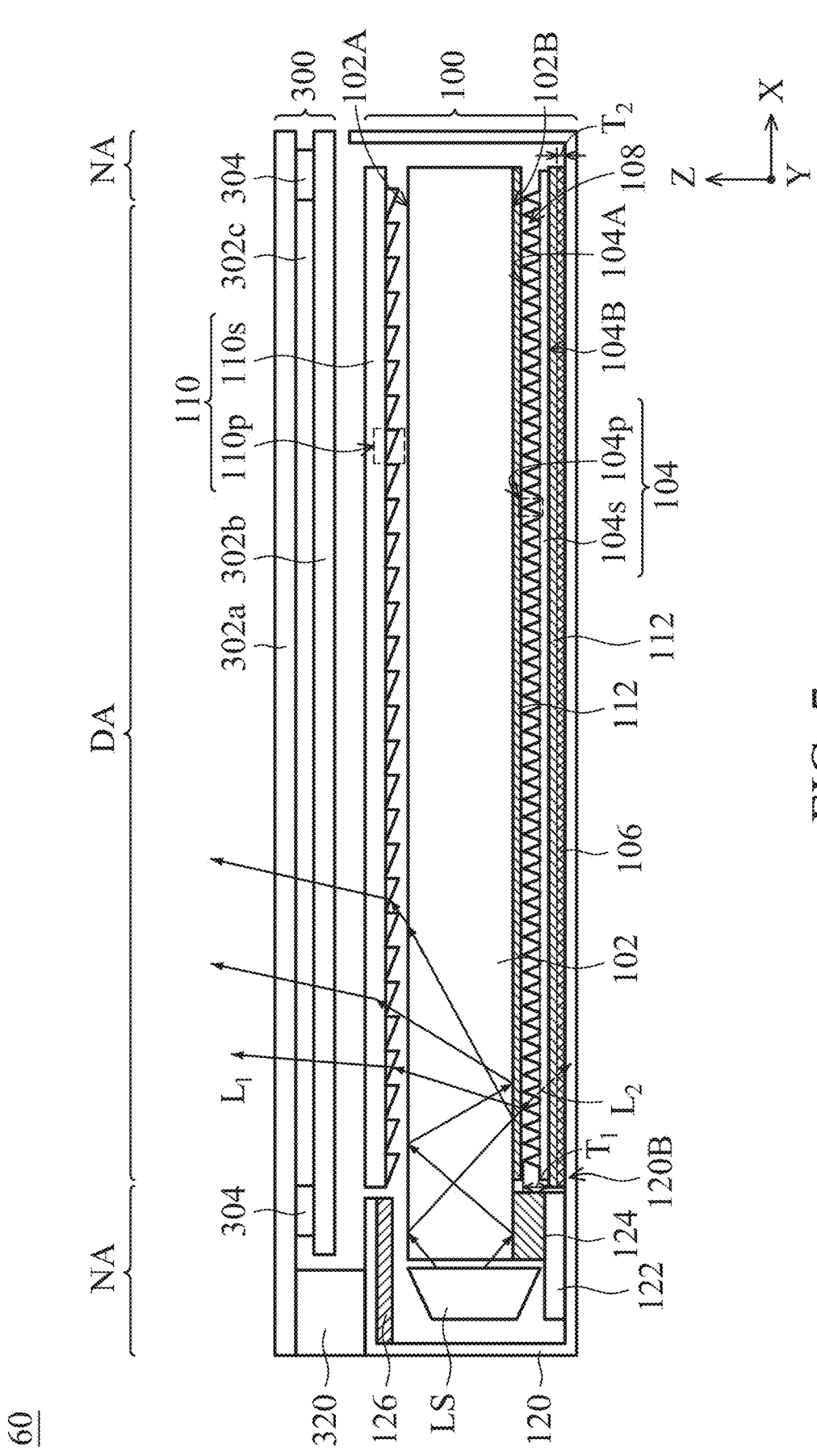
FIG. 7 is a cross-sectional schematic diagram of an electronic device in accordance with some embodiments of the present disclosure.

Refer to FIG. 7, which is a cross-sectional schematic diagram of an electronic device 60 in accordance with some other embodiments of the present disclosure. The electronic device 60 shown in FIG. 7 is similar to the electronic device 40 shown in FIG. 5. The difference between them includes that the electronic device 60 may include the absorption layer 106, and the adhesive element 112 may be disposed between the light-guiding element 104 and the absorption layer 106, the light-guiding element 104 can be adhered to the absorption layer 106. The arrangement of the adhesive element 112 can reduce the positional shifting of the light-guiding element 104 and the absorption layer 106, or integrate components to simplify the assembly process.

Figure 8:
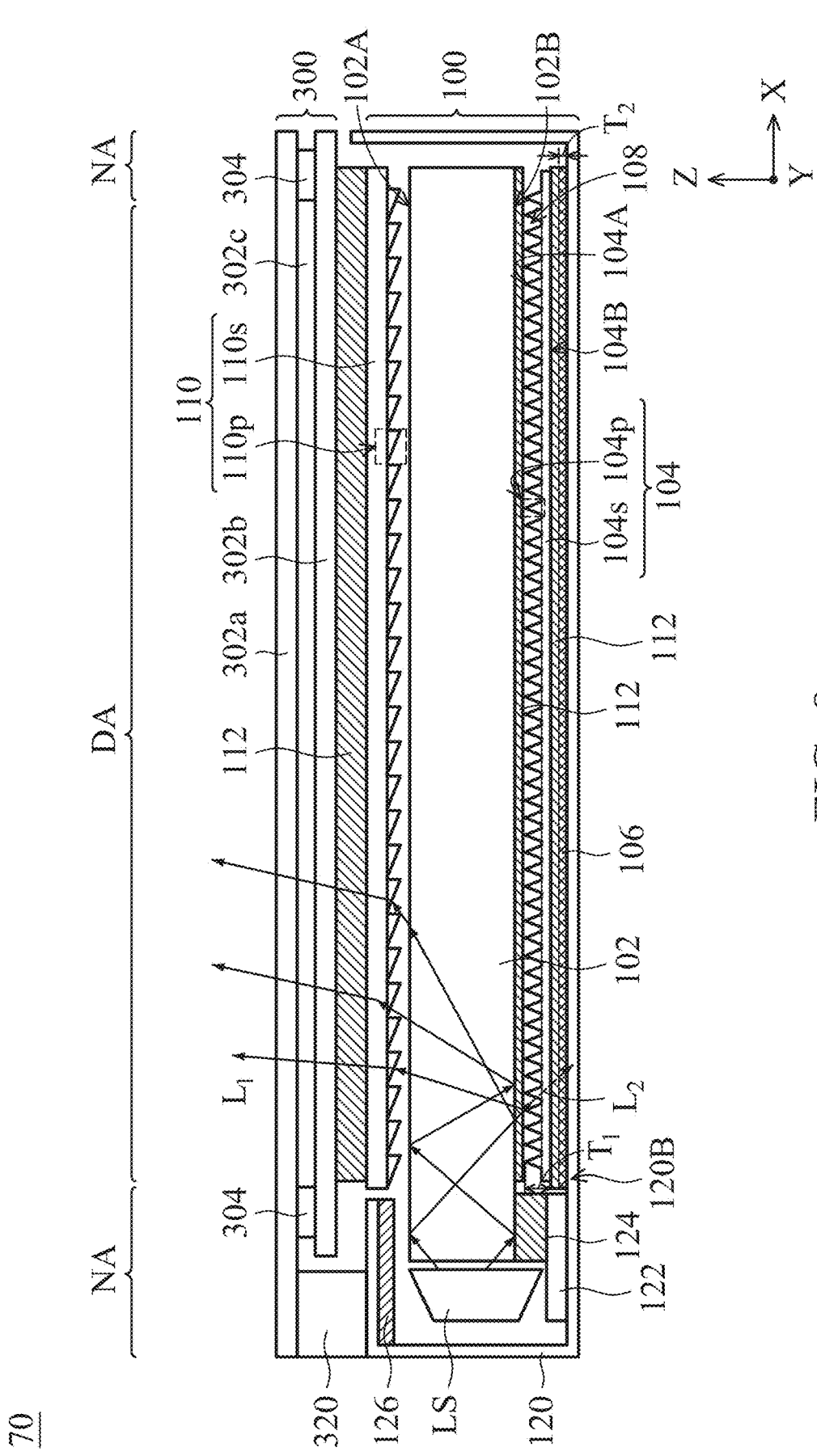
FIG. 8 is a cross-sectional schematic diagram of an electronic device in accordance with some embodiments of the present disclosure.

Refer to FIG. 8, which is a cross-sectional schematic diagram of an electronic device 70 in accordance with some other embodiments of the present disclosure. The electronic device 70 shown in FIG. 8 is similar to the electronic device 60 shown in FIG. 7. The difference between them includes that in the electronic device 70, the adhesive element 112 may be disposed between the panel 300 and the light-adjusting element 110, and the panel 300 may be adhered to the light-adjusting element 110. In detail, the adhesive element 112 may be disposed between the second substrate 302b of the panel 300 and the light-adjusting element 110, The adhesive element 112 can reduce the positional shifting of the panel 300 and the light-adjusting element 110, or integrate components to simplify the assembly process.

Figure 9:
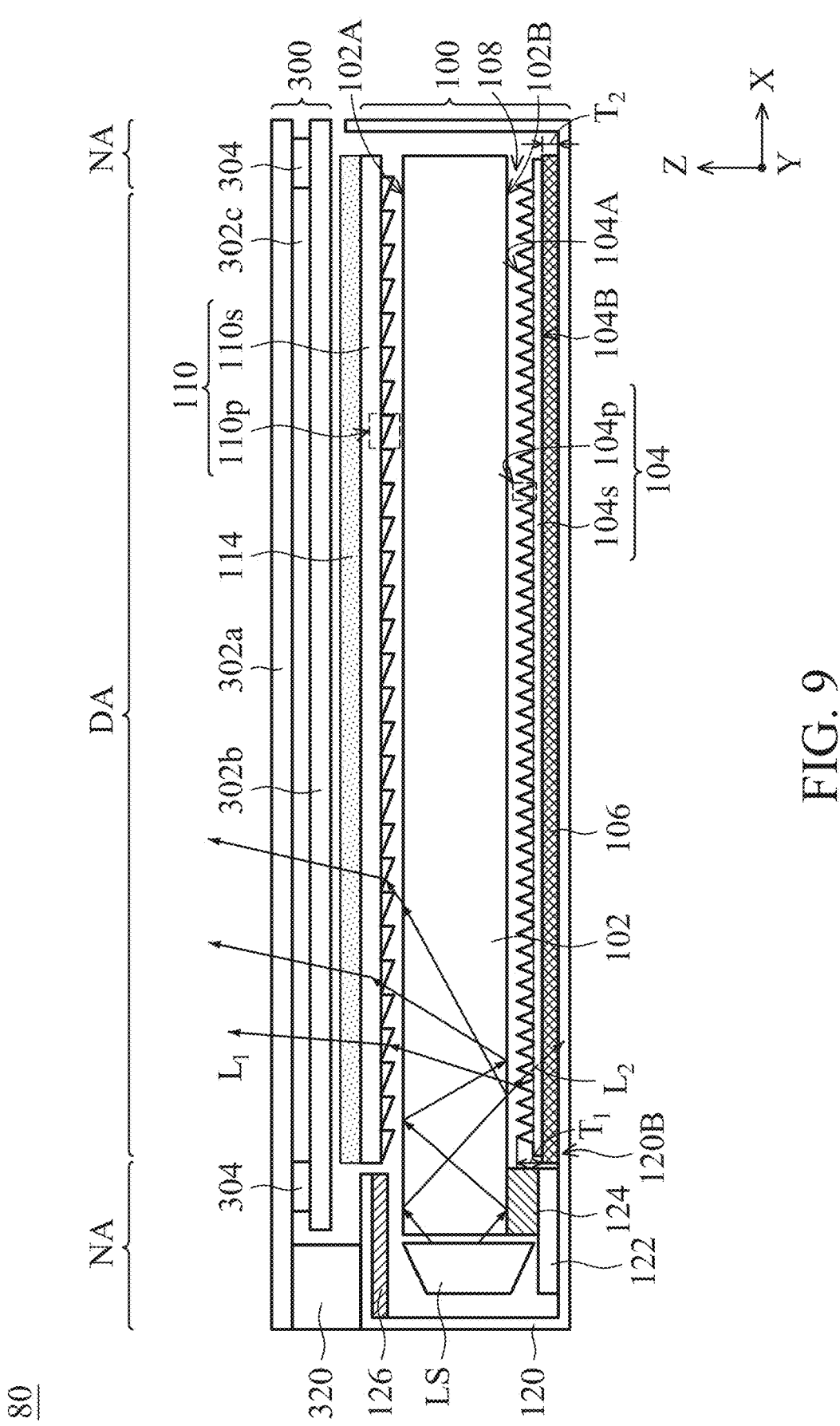
FIG. 9 is a cross-sectional schematic diagram of an electronic device in accordance with some embodiments of the present disclosure.

Refer to FIG. 9, which is a cross-sectional schematic diagram of an electronic device 80 in accordance with some other embodiments of the present disclosure. The electronic device 80 shown in FIG. 9 is similar to the electronic device 10 shown in FIG. 1A. The difference between them includes that in the electronic device 80, the backlight module 100 may further include a polarization-adjusting element 114, and the polarization-adjusting element 114 may be disposed between the light-guiding plate 102 and the panel 300, and the panel 300 may be disposed on the light-guiding plate 104. In some embodiments, the polarization-adjusting element 114 may be in contact with the light-adjusting element 110. In some embodiments, the polarization-adjusting element 114 may be used to change the polarization direction of the light, for example, the polarization direction of the light is modulated substantially perpendicular to the extension direction (third direction $A_3$) of the light source LS. In addition, the polarization direction of the light modulated by the polarization-adjusting element 114 as described above may be substantially parallel to the direction of the transmission axis of the lower polarizing plate (not illustrated) of the panel 300 to reduce the loss of the light passing through the lower polarizing plate, thereby increasing contrast or reduce power consumption. For example, in some embodiments, the polarization-adjusting element 114 may be a panel, such as an electrically controlled birefringence (ECB) panel or other suitable panels, the polarization characteristics of light can be adjusted by the polarization-adjusting element 114 to enhance the privacy (anti-peeping) effect. In some embodiments, when the polarization-adjusting element 114 is a panel, it may not include an optical filter layer.

It should be understood that although the electronic device 80 shown in the drawings has both the polarization-adjusting element 114 and the light-adjusting element 110, in some embodiments, the polarization-adjusting element 114 and the light-adjusting element 110 may be used separately.

Figure 10:
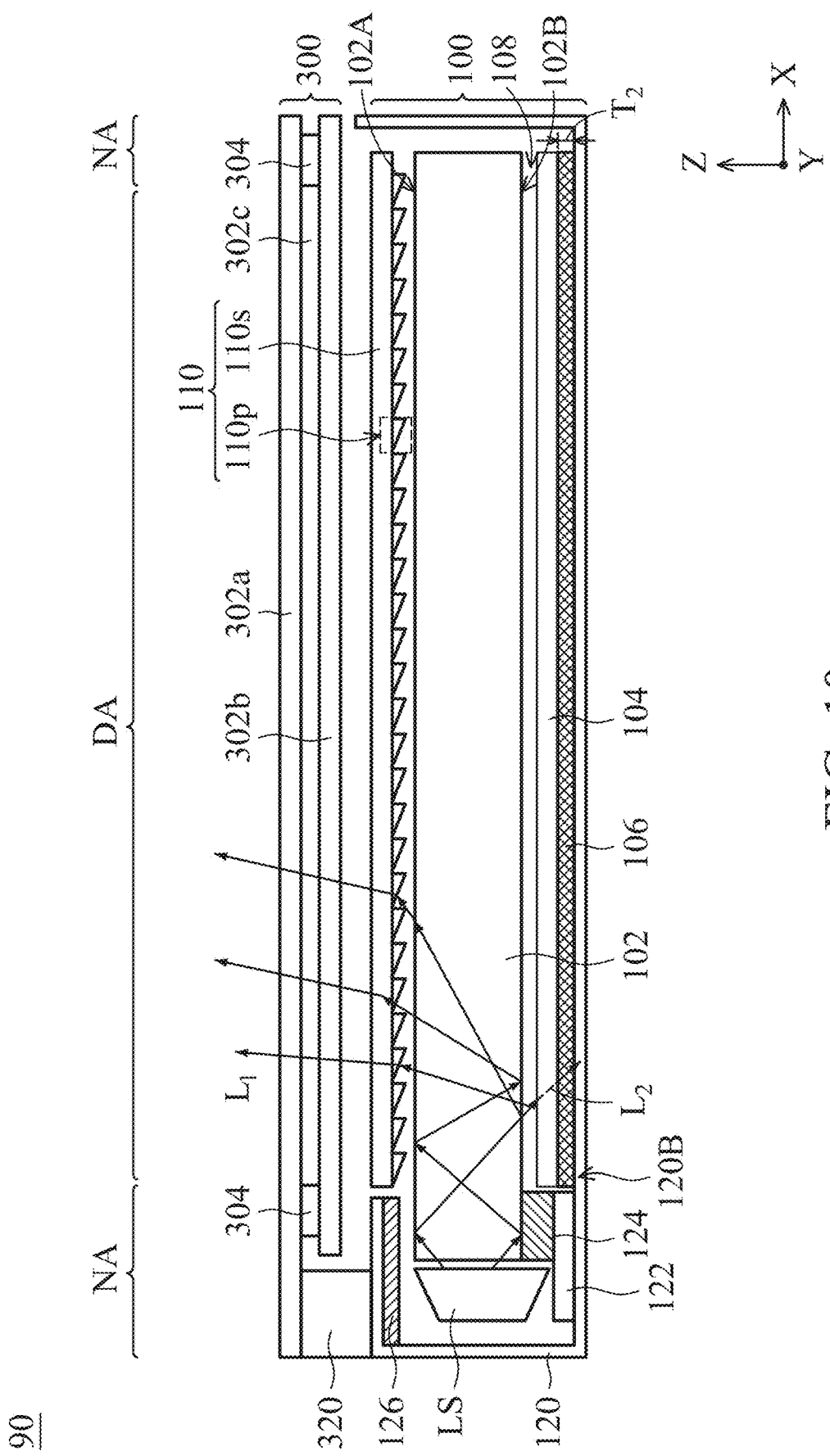
FIG. 10 is a cross-sectional schematic diagram of an electronic device in accordance with some embodiments of the present disclosure.

Refer to FIG. 10, which is a cross-sectional schematic diagram of an electronic device 90 in accordance with some other embodiments of the present disclosure. The electronic device 90 shown in FIG. 10 is similar to the electronic device 10 shown in FIG. 1A. The difference between them includes that the light-guiding element 104 may not have the protruding structure 104p. The light-guiding element 104 may be disposed under the light-guiding plate 102, and the light-guiding element 104 has polarization characteristics, the light scattered from the bottom of the light-guiding plate 102 and passed through the light-guiding element 104 may have polarization characteristics when reflected back to the light-guiding plate 102. For example, the light-guiding element 104 can guide the polarization direction of the light substantially perpendicular to the extension direction (third direction $A_3$) of the light source LS, thereby increasing contrast or reducing power consumption, but it is not limited thereto. In some embodiments, the light-guiding element 104 may comprise a prism structure, an advanced protein characterization facility (APCF), a dual brightness enhancement film (DBEF), a polarizing plate, other materials with polarization characteristics or a combination thereof, but it is not limited thereto. Furthermore, it should be understood that in some embodiments (not illustrated), the electronic device 90 may optionally include a plurality of light-guiding elements 104, the materials of these light-guiding elements 104 may be different. Referring to FIG. 10, similarly, in some embodiments, the light-guiding element 104 may be disposed between the light-guiding plate 102 and the absorption layer 106. In some embodiments, the light-guiding element 104 may be in contact with the absorption layer 106. In some other embodiments (not illustrated), the light-guiding element 104 may be disposed between the light-guiding plate 102 and the reflective layer 206. In some other embodiments (not illustrated), the light-guiding element 104 may be in contact with the reflective layer 206.

Figure 11:
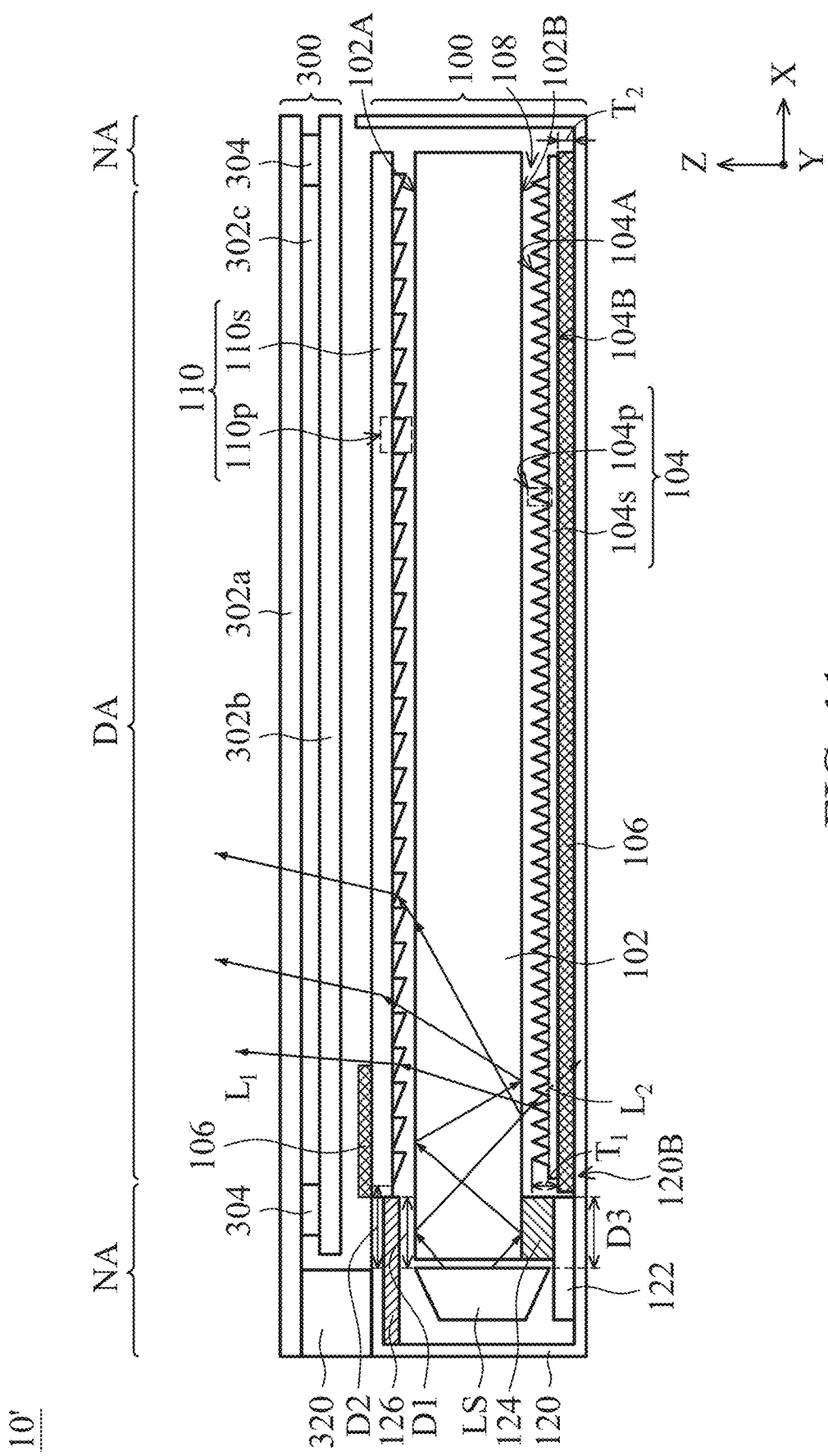
FIG. 11 is a cross-sectional schematic diagram of an electronic device in accordance with some embodiments of the present disclosure.

Refer to FIG. 11, which is a cross-sectional schematic diagram of an electronic device 10' in accordance with some other embodiments of the present disclosure. The electronic device 10' shown in FIG. 11 is similar to the electronic device 10 shown in FIG. 1A. The difference between them includes that in the electronic device 10', the light-adjusting element 110 may be in contact with the reflective element 126. In some embodiments, the light-adjusting element 110 may be substantially aligned with the reflective element 126. In addition, in the electronic device 10', the absorption layer 106 may be disposed on the light-adjusting element 110. For example, the absorption layer 106 may be disposed on the upper surface (i.e. the surface close to the panel 300) of part of the light-adjusting element 110, and the absorption layer 106 may be adjacent to the light source LS to absorb part of the light that is emitted from the light incident side, thereby reducing the display image showing water ripples in a side adjacent to the light entrance side, and/or increase the display quality. In some embodiments (not illustrated), the absorption layer 106 is disposed on the lower surface of the light-adjusting element 110 (i.e. the surface close to the light-guiding plate 102). In some embodiments, the absorption layer 106 may be formed by screen printing or other suitable methods, but is not limited thereto.

Referring to FIG. 11, in some embodiments, in the X direction, a first distance D1 may exist between the light source LS and the light-adjusting element 110, and the first distance D1 may be in a range from 1 millimeter (mm) to 12 millimeters (1 millimeter≤first distance D1≤12 millimeters), but it is not limited thereto. The first distance D1 may be defined by a minimum distance between the light source LS and the light-adjusting element 110 in the X direction. In some embodiments, in the X direction, the first distance D1 may be in a range from 4 millimeters to 12 millimeters (4 millimeters≤first distance D1≤12 millimeters). In some embodiments (not illustrated), a portion of the light-adjusting element 110 close to the light source LS does not have the protruding structure 110p, the optical structure 110b or other microstructures thereon. In other words, the protruding structure 110p, the optical structure 110b or other microstructures may be not be formed on a portion of the base 110s adjacent to the light source LS to reduce the problem that the display image adjacent to the light incident side will show ripples, or to increase the display quality. Specifically, in some embodiments, in the X direction, a second distance D2 may exist between the protruding structure 110p (or optical structure 110b) of the light-adjusting element 110 and the light source LS, and the second distance D2 may be greater than or equal to the first distance D1. The second distance D2 may be defined by a minimum distance between the protruding structure 110p (or the optical structure 110b) and the light source LS in the X direction. In some embodiments, in the X direction, the second distance D2 may be in a range from 2 millimeters to 12 millimeters (2 millimeters≤second distance D2≤12 millimeters), but it is not limited thereto. In some embodiments, in the X direction, the second distance D2 may be in a range from 4 millimeters to 12 millimeters (4 millimeters≤second distance D2≤12 millimeters), but it is not limited thereto. In some embodiments, in the X direction, a third distance D3 may exist between the light source LS and an edge of the circuit board 122 adjacent to the light-guiding plate 102), and the third distance D3 may be in a range from 1 millimeter to 6 millimeters (1 millimeter≤third distance D3≤6 millimeters), but it is not limited thereto. The third distance D3 may be defined by a minimum distance between the light source LS and the edge of the circuit board 122 adjacent to the light-guiding plate 102) in the X direction. In some embodiments, the first distance D1 may be greater than or equal to the third distance D3, but it is not limited thereto. In some embodiments, the second distance D2 may be greater than or equal to the third distance D3, but it is not limited thereto. In some embodiments, the upper surface of the light-guiding plate 102 or the lower surface of the light-guiding plate 102 may have microstructures, but a portion of the light-guiding plate 102 that is adjacent to the light source LS may not have microstructures, and the problem of ripples of the display image adjacent to the light incident side may be reduced, thereby increasing the display quality.

To summarize the above, in accordance with some embodiments of the present disclosure, the provided electronic device includes the light-guiding element, which can reduce the disturbance of the interference light, or increase the contrast and/or brightness of the displayed image. In some embodiments, the electronic device includes the absorption layer corresponding to the display area, which can absorb at least part of the interference light, or to improve the contrast and/or brightness of the displayed image. In addition, in some embodiments, with the relative configuration of some components, the thickness of the backlight module can be thinner, or the privacy effect (anti-peeping effect) can be increased.

Although the present invention has been disclosed as above with preferred embodiments, it is not intended to limit the present invention. Any person skilled in the art can make some modifications and improvements without departing from the spirit and scope of the present invention. The scope of protection shall be as defined in the claims.

Although some embodiments of the present disclosure and their advantages have been described in detail, it should be understood that various changes, substitutions and alterations can be made herein without departing from the spirit and scope of the disclosure as defined by the appended claims. In addition, each claim constitutes an individual embodiment, and the claimed scope of the present disclosure includes the combinations of the claims and embodiments. The features of the various embodiments can be used in any combination as long as they do not depart from the spirit and scope of the present disclosure. The scope of protection of present disclosure is subject to the definition of the scope of the appended claims.

What is claimed is:

1. An electronic device, comprising:
   a backlight module, comprising:
   a light-guiding plate;
   a light-guiding element disposed under the light-guiding plate; and
   a light-adjusting element disposed on the light-guiding plate, wherein the light-guiding element has a first protruding structure facing the light-guiding plate, the light-adjusting element has a second protruding structure facing the light-guiding plate, and the first protruding structure and the second protruding structure extend along different directions.

2. The electronic device as claimed in claim 1, wherein the first protruding structure comprises a tapered structure.

3. The electronic device as claimed in claim 1, wherein the first protruding structure comprises a sharp-angled structure, an obtuse angle structure, a trapezoidal structure or a combination thereof.

4. The electronic device as claimed in claim 1, further comprising a panel, the panel having a display area and a non-display area, wherein the backlight module further comprises an absorption layer, and the absorption layer is disposed under the light-guiding plate and corresponds to the display area.

5. The electronic device as claimed in claim 4, wherein the light-guiding element at least partially overlap with the display area in a normal direction of the panel.

6. The electronic device as claimed in claim 4, wherein the reflectivity of the absorption layer is in a range from 0% to 25%.

7. The electronic device as claimed in claim 4, wherein the light-guiding element is disposed between the light-guiding plate and the absorption layer.

8. The electronic device as claimed in claim 1, wherein the backlight module further comprises an adhesive element, and the adhesive element is disposed between the light-guiding element and the light-guiding plate.

9. The electronic device as claimed in claim 1, wherein the backlight module further comprises an air layer existing between the light-guiding element and the light-guiding plate.

10. The electronic device as claimed in claim 1, wherein the light-adjusting element further comprises an optical structure, the optical structure is away from the light-guiding plate, and a haze of the optical structure is in a range from 50% to 99%.

11. The electronic device as claimed in claim 10, wherein a roughness of the optical structure is in a range from 0.3 micrometers to 0.75 micrometers.

12. The electronic device as claimed in claim 1, wherein the light-adjusting element further comprises a base and an optical structure, and the optical structure and the second protruding structure of the light-adjusting element are disposed on opposite sides of the base.

13. The electronic device as claimed in claim 1, wherein the backlight module further comprises a reflective layer, wherein the light-guiding element is disposed between the reflective layer and the light-guiding plate.

14. The electronic device as claimed in claim 12, wherein the backlight module comprises a light source disposed adjacent to the light-guiding plate, and a portion of the light-adjusting element close to the light source do not have the second protruding structure thereon.

15. The electronic device as claimed in claim 1, comprising a panel disposed on the light-guiding plate, and the backlight module further comprises a polarization-adjusting element disposed between the light-guiding plate and the panel.

* * * * *